(12) United States Patent
Hanamura et al.

(10) Patent No.: US 12,491,712 B2
(45) Date of Patent: *Dec. 9, 2025

(54) LIQUID EJECTING SYSTEM

(71) Applicant: SEIKO EPSON CORPORATION, Tokyo (JP)

(72) Inventors: Yuki Hanamura, Azumino (JP); Takao Yamamoto, Matsumoto (JP); Nobuaki Ito, Shiojiri (JP); Shunya Fukuda, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

This patent is subject to a terminal disclaimer.

(21) Appl. No.: 18/047,158

(22) Filed: Oct. 17, 2022

(65) Prior Publication Data

US 2023/0119224 A1    Apr. 20, 2023

(30) Foreign Application Priority Data

Oct. 18, 2021  (JP) ................................ 2021-170093

(51) Int. Cl.
*B41J 2/045* (2006.01)
*G06F 3/12* (2006.01)
*H04N 1/23* (2006.01)

(52) U.S. Cl.
CPC ....... *B41J 2/04588* (2013.01); *B41J 2/04513* (2013.01); *B41J 2/04536* (2013.01); *B41J 2/04581* (2013.01); *B41J 2/0459* (2013.01); *G06F 3/1229* (2013.01); *H04N 1/2346* (2013.01)

(58) Field of Classification Search
CPC .................................................... B41J 2/04588
See application file for complete search history.

(56) References Cited

U.S. PATENT DOCUMENTS

| | | | |
|---|---|---|---|
| 2002/0118238 A1* | 8/2002 | Suzuki | G06K 15/02 347/9 |
| 2013/0016147 A1* | 1/2013 | Cardells Tormo | B41J 2/17566 347/14 |
| 2017/0136767 A1* | 5/2017 | Sano | B41J 2/04563 |
| 2020/0236242 A1* | 7/2020 | Kwak | H04N 1/00896 |
| 2021/0162744 A1 | 6/2021 | Shimizu et al. | |
| 2022/0063268 A1* | 3/2022 | Toyofuku | B41J 2/04588 |
| 2022/0221816 A1* | 7/2022 | Deura | G03G 15/556 |

FOREIGN PATENT DOCUMENTS

| | | | |
|---|---|---|---|
| JP | 2002240320 A | * | 8/2002 |
| JP | 2009-066948 A | | 4/2009 |
| JP | 2021-084388 | | 6/2021 |

* cited by examiner

*Primary Examiner* — Shelby L Fidler
(74) *Attorney, Agent, or Firm* — WORKMAN NYDEGGER

(57) ABSTRACT

A liquid ejecting system includes a head unit that includes a nozzle for ejecting a liquid, a pressure chamber communicating with the nozzle, and a drive element for applying pressure fluctuation to a liquid in the pressure chamber by supplying a drive pulse, a first connection portion that is communicably connected to a server through a network, a decision portion that decides a waveform of the drive pulse supplied to the drive element based on first input information, and a first input portion to which the first input information is input from the server through the first connection portion.

18 Claims, 23 Drawing Sheets

FIG. 8

TBL1

| Potential | Number of times of driving [$10^8$ times] | | | | |
|---|---|---|---|---|---|
| | 1 or less | 1 to 2 | 2 to 3 | 3 to 4 | 4 or more |
| 0.7E or less | 0 | 0 | 0 | 2 | 5 |
| 0.7E to 0.9E | 0 | 0 | 1 | 3 | 6 |
| 0.9E to 1.1E | 0 | 0 | 2 | 6 | 9 |
| 1.1E to 1.3E | 0 | 1 | 3 | 7 | 11 |
| 1.3E or more | 0 | 1 | 5 | 10 | 15 |

(Degree of deterioration)

FIG. 9

TBL2

| Degree of deterioration | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Correction value | 0 | 1 | 2 | 3 | 5 | 7 | 9 | 12 | 15 | 18 | 22 | 27 | 34 | 42 | 53 | 67 |

FIG. 11

| | CORRECTION VALUE | | | | |
|---|---|---|---|---|---|
| | NUMBER OF TIMES OF DRIVING [10⁸ TIMES] | | | | |
| | 1 OR LESS | 1 TO 2 | 2 TO 3 | 3 TO 4 | 4 OR MORE |
| POTENTIAL 0.7E OR LESS | 0 | 0 | 0 | 2 | 7 |
| 0.7E TO 0.9E | 0 | 0 | 1 | 3 | 9 |
| 0.9E TO 1.1E | 0 | 0 | 2 | 9 | 18 |
| 1.1E TO 1.3E | 0 | 0 | 3 | 12 | 27 |
| 1.3E OR MORE | 0 | 1 | 7 | 22 | 67 |

TBL3

LIQUID EJECTING SYSTEM

The present application is based on, and claims priority from JP Application Serial Number 2021-170093, filed Oct. 18, 2021, the disclosure of which is hereby incorporated by reference herein in its entirety.

BACKGROUND

1. Technical Field

The present disclosure relates to a liquid ejecting system.

2. Related Art

In a liquid ejecting apparatus such as an ink jet printer, generally, a liquid such as ink is ejected from a head by supplying a drive pulse to a drive element such as a piezoelectric element. Here, in order to eject ink from the head with a desired ejection characteristic, it is necessary to appropriately set a waveform of the drive pulse.

For example, JP-A-2009-66948 discloses a technique for correcting a waveform of a drive pulse according to the number of times of ink ejection, for the purpose of reducing deterioration of print quality due to deterioration of the piezoelectric element over time. In the technique disclosed in JP-A-2009-66948, voltage correction information for the correction is stored in advance in an ink jet recording apparatus. The voltage correction information is information indicating a correspondence relationship between the number of times of ink ejection and a voltage value for correcting the drive pulse.

In recent business models, the manufacturer of the printer main body, which is an element excluding the head among elements constituting a printer, may be different from the manufacturer of the head. In this case, usage conditions such as the waveform of the drive pulse, the type of ink, and the usage temperature of the head differ depending on the printer manufacturer or user. The degree of progress of deterioration of the drive element varies depending on the usage conditions. For this reason, unlike when the manufacturer of the printer main body is the same as the manufacturer of the head, it is difficult for the manufacturer of the head to store the above-mentioned information on the correspondence relationship in the printer in advance. Therefore, in the related art, the manufacturer of the printer main body has to set a function of notifying the user of the degree of deterioration of the drive element and suppressing the deterioration of the ejection characteristics due to the deterioration of the drive element by itself. Therefore, it leads to an increase in the load on the manufacturer of the printer main body. In addition, the manufacturer of the printer main body cannot make settings, and the printer main body cannot perform the above functions, which may result in impairing the convenience of the printer user.

SUMMARY

According to an aspect of the present disclosure, there is provided a liquid ejecting system including a head unit that includes a nozzle for ejecting a liquid, a pressure chamber communicating with the nozzle, and a drive element for applying pressure fluctuation to a liquid in the pressure chamber by supplying a drive pulse, a first connection portion that is communicably connected to a server through a network, a decision portion that decides a waveform of the drive pulse supplied to the drive element based on first input information, and a first input portion to which the first input information is input from the server through the first connection portion.

According to another aspect of the present disclosure, there is provided a liquid ejecting system including a head unit that includes a nozzle for ejecting a liquid, a pressure chamber communicating with the nozzle, and a drive element for applying pressure fluctuation to a liquid in the pressure chamber by supplying a drive pulse, a first connection portion that is communicably connected to a server through a network, a notification portion that notifies a user of a determination result of deterioration of the drive element based on second input information, and a first input portion to which the second input information is input from the server through the first connection portion.

According to still another aspect of the present disclosure, there is provided a liquid ejecting system including a head unit that includes a nozzle for ejecting a liquid, a pressure chamber communicating with the nozzle, and a drive element for applying pressure fluctuation to a liquid in the pressure chamber by supplying a drive pulse, a first connection portion that is communicably connected to a server through a network, and a first output portion that outputs output information regarding a degree of deterioration of the drive element to the server through the first connection portion.

BRIEF DESCRIPTION OF THE DRAWINGS

FIG. 8 is a diagram showing an example of a first table included in correspondence information.

FIG. 9 is a diagram showing an example of a second table included in correspondence information.

FIG. 11 is a diagram showing another example of correspondence information.

DESCRIPTION OF EXEMPLARY EMBODIMENTS

Figure 1:
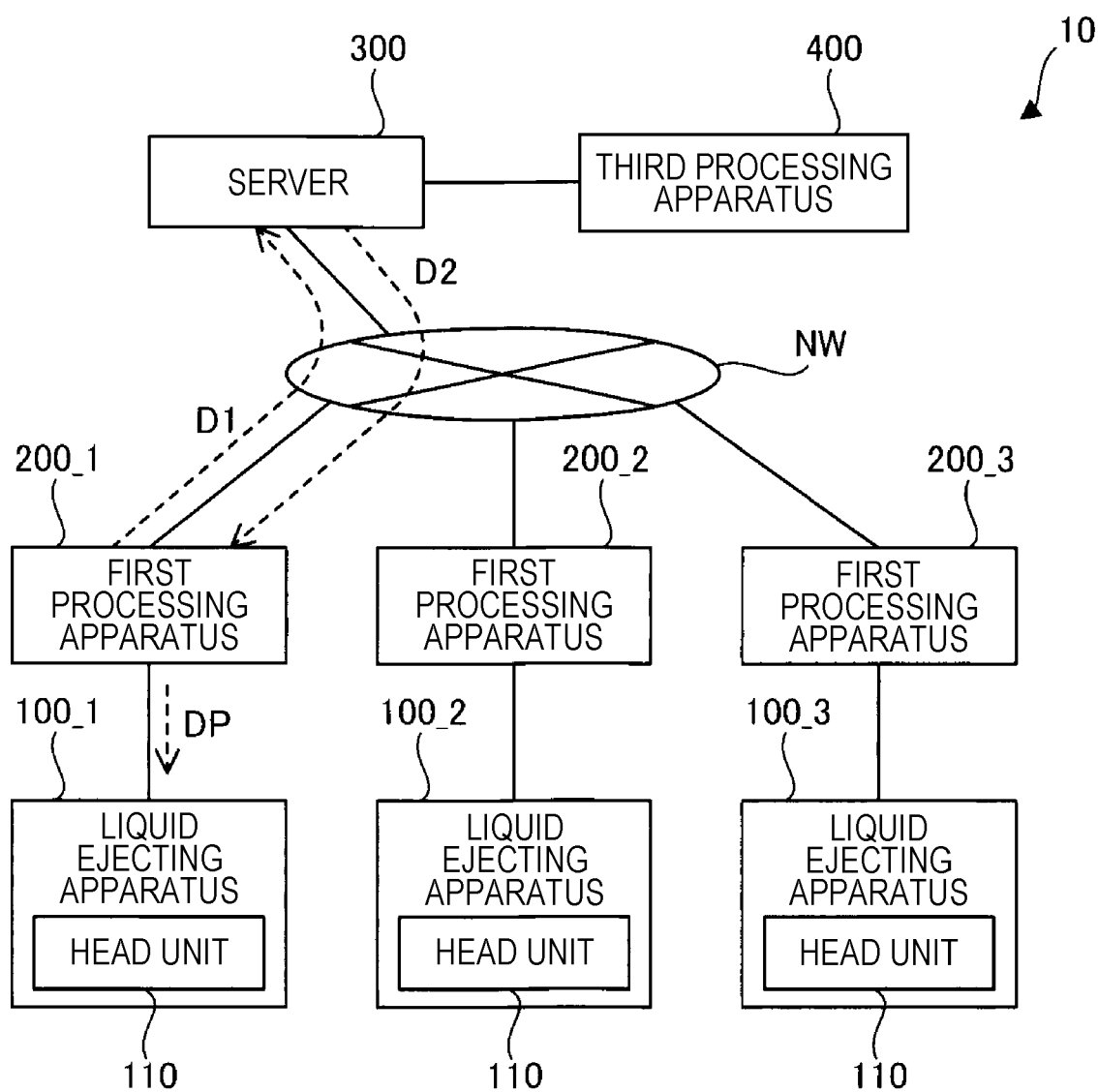
FIG. 1 is a schematic diagram showing a configuration example of a liquid ejecting system according to a first embodiment.

Hereinafter, preferred embodiments according to the present disclosure will be described with reference to the accompanying drawings. In the drawings, the dimensions and scale of each portion are appropriately different from the actual ones, and some portions are schematically shown for easy understanding. Further, the scope of the present disclosure is not limited to the embodiments unless it is stated in the following description that the present disclosure is particularly limited.

1. FIRST EMBODIMENT 1-1. Outline of Liquid Ejecting System

FIG. 1 is a schematic diagram showing a configuration example of a liquid ejecting system 10 according to a first embodiment. The liquid ejecting system 10 is a system that performs printing by an ink jet method, and has a function of correcting a waveform of a drive pulse used for the printing. In the example shown in FIG. 1, the liquid ejecting system 10 includes liquid ejecting apparatuses 100_1 to 100_3, first processing apparatuses 200_1 to 200_3, a server 300, and a third processing apparatus 400.

Here, the liquid ejecting apparatuses 100_1 to 100_3 are provided by a manufacturer of a printer main body (described later). Each of the liquid ejecting apparatuses 100_1 to 100_3 may be provided by the same manufacturer or may be provided by different manufacturers. The first processing apparatuses 200_1 to 200_3 may be owned by the user or may be provided by the manufacturer of the printer main body. On the other hand, head units 110 incorporated in the liquid ejecting apparatuses 100_1 to 100_3 are provided by the manufacturer of the head (described later). The server 300 is maintained and managed by a head manufacturer.

When a user uses the printer main body, the user owns the liquid ejecting apparatus 100_1, the first processing apparatus 200_1, and the head unit 110. On the other hand, although the user does not own the server 300, the user can communicate (connected to) with the server 300 through a communication network NW (described later).

The user refers to a person who uses the liquid ejecting apparatus 100_1. For example, when the manufacturer of the printer main body, who purchases the head from the head manufacturer and manufactures the printer main body, uses the printer main body, the manufacturer of the printer main body is the user. Further, for example, when the manufacturer of the printer main body purchases the head from the head manufacturer and manufactures the printer main body, and a third party purchases and uses the printer main body from the manufacturer of the printer main body, the third party is the user.

The liquid ejecting apparatus 100_1 is communicably connected to the first processing apparatus 200_1. The liquid ejecting apparatus 100_2 is communicably connected to the first processing apparatus 200_2. The liquid ejecting apparatus 100_3 is communicably connected to the first processing apparatus 200_3. As described above, the liquid ejecting apparatuses 100_1 to 100_3 correspond to the first processing apparatuses 200_1 to 200_3, respectively, and are communicably connected to the first processing apparatuses 200_1 to 200_3. In the following, without distinguishing each of the liquid ejecting apparatuses 100_1 to 100_3, they may be referred to as the liquid ejecting apparatus 100. Without distinguishing each of the first processing apparatuses 200_1 to 200_3, they may be referred to as the first processing apparatus 200.

In the example shown in FIG. 1, the number of each of the liquid ejecting apparatus 100 and the first processing apparatus 200 included in the liquid ejecting system 10 is three, but the number is not limited thereto, and the number may be one, two, or four or more. That is, the number of sets of the liquid ejecting apparatus 100 and the first processing apparatus 200 is not limited to three, and may be one, two, or four or more.

The liquid ejecting apparatus 100 is a printer that prints an image based on recorded data DP from the first processing apparatus 200 on a print medium by an ink jet method. The recorded data DP is image data in a format that can be processed by the liquid ejecting apparatus 100. The print medium may be any medium as long as it can be printed by the liquid ejecting apparatus 100, and is not particularly limited, and is, for example, various papers, various cloths, various films, and the like. The liquid ejecting apparatus 100 may be a serial type printer or a line type printer.

The liquid ejecting apparatus 100 has the head unit 110. The head unit 110 is a module including an ink jet head. In the following, among the elements constituting the liquid ejecting apparatus 100, the elements other than the head unit 110 may be referred to as a "printer main body". Further, the head unit 110 or a liquid ejecting head 110a to be described later may be simply referred to as a "head". A configuration of the liquid ejecting apparatus 100 will be described in detail later with reference to FIGS. 2 and 3.

The first processing apparatus 200 is a computer such as a desktop type or a laptop type, and has a function of generating the recorded data DP, a function of controlling printing by the liquid ejecting apparatus 100, and a function of deciding a waveform of a drive pulse PD used for the printing. A configuration of the first processing apparatus 200 will be described in detail later with reference to FIG. 4.

The first processing apparatus 200 is communicably connected to the server 300 through the communication network NW including the Internet. The first processing apparatus 200 outputs output information D1 to the server 300 and inputs input information D2 from the server 300. The output information D1 is information regarding the degree of deterioration of a drive element 111f, to be described later. The input information D2 is information including information on a waveform of the drive pulse after correction to be described later or a correction value for correction thereof. The first processing apparatus 200 decides the waveform of the drive pulse based on the input information D2. Further, the first processing apparatus 200 generates the recorded data DP by performing various processing, such as raster image processor (RIP) processing or color conversion processing, on image data in the file format such as PostScript, a portable document format (PDF), and an XML paper specification (XPS).

The server 300 is a computer that functions as a cloud server, and has a function of inputting the output information D1 from the first processing apparatus 200, a function of generating the input information D2 based on the output information D1, and a function of outputting the generated input information D2 to the first processing apparatus 200. A configuration of the server 300 will be described in detail later with reference to FIG. 5.

Further, the server 300 is communicably connected to the third processing apparatus 400, and appropriately transmits and receives information necessary for generating the input information D2. The third processing apparatus 400 is a computer that inputs the output information D1 from the server 300 as needed and outputs information necessary for generating the input information D2 to the server 300.

In the above-described liquid ejecting system 10, the first processing apparatus 200 decides the waveform of the drive pulse based on the input information D2, thereby making it possible to correct the waveform of the drive pulse so as to reduce the deterioration of the print quality due to the deterioration of the drive element 111f over time. Therefore, even when the manufacturer of the printer main body is different from the manufacturer of the head, it is possible to reduce the burden on the manufacturer or the user of the printer main body and reduce the deterioration of the print quality due to the deterioration of the drive element 111f over time. Here, generating the input information D2 based on the output information D1 on the server 300 has an advantage that the input information D2 can be easily optimized as compared with the configuration in which the input information D2 is generated by the liquid ejecting apparatus 100. The advantage brings about the effect that the waveform of the drive pulse can be suitably decided by the liquid ejecting apparatus 100. Hereinafter, the liquid ejecting system 10 will be described in detail.

1-2. Configuration of Liquid Ejecting Apparatus

Figure 2:
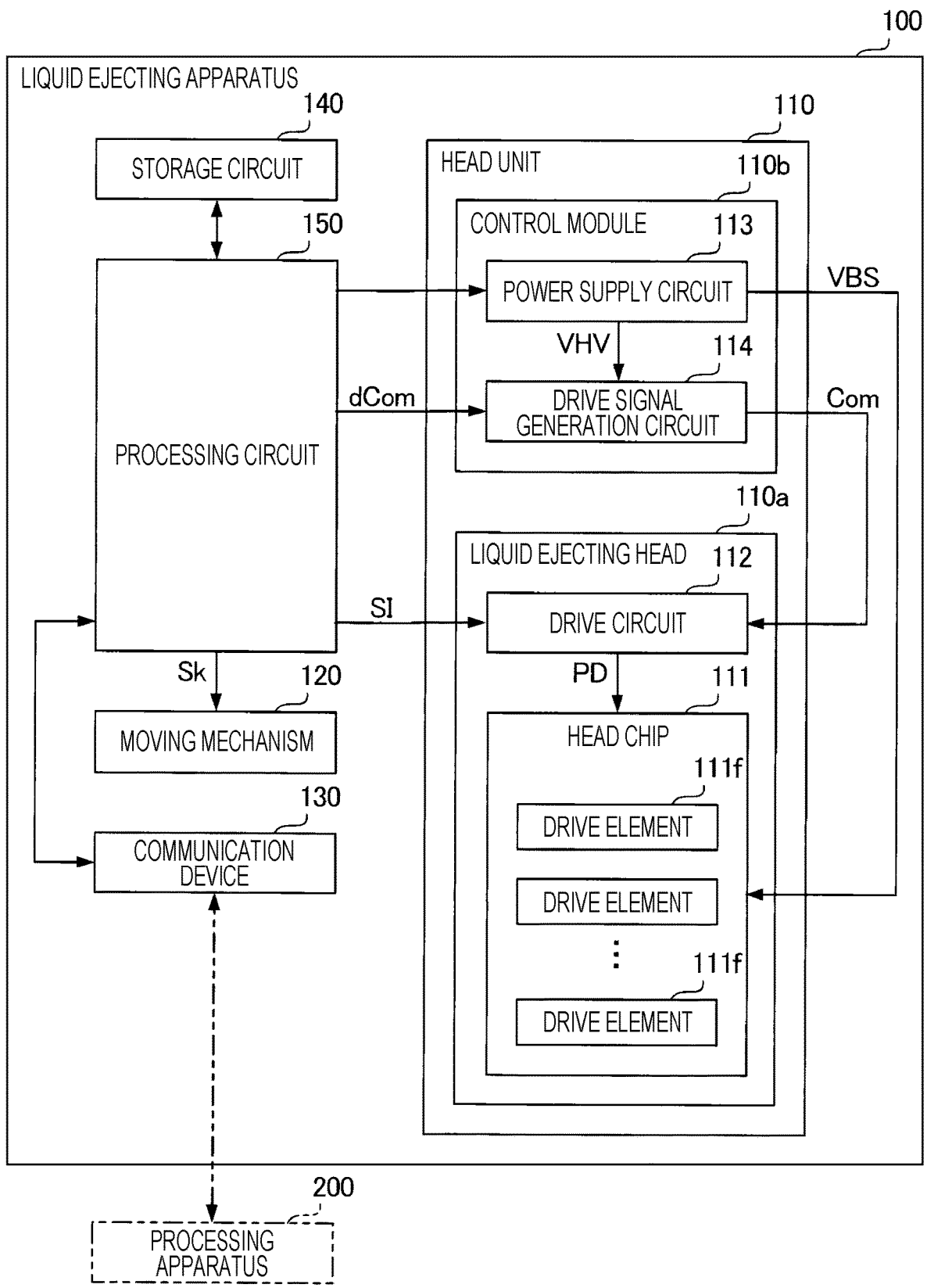
FIG. 2 is a schematic diagram showing a configuration example of a liquid ejecting apparatus used in the liquid ejecting system according to the first embodiment.

FIG. 2 is a schematic diagram showing a configuration example of the liquid ejecting apparatus 100 used in the liquid ejecting system 10 according to the first embodiment. As shown in FIG. 2, the liquid ejecting apparatus 100 includes the head unit 110, a moving mechanism 120, a communication device 130, a storage circuit 140, and a processing circuit 150.

The head unit 110 is an assembly including a head chip 111, a drive circuit 112, a power supply circuit 113, and a drive signal generation circuit 114.

In the example shown in FIG. 2, the head unit 110 is divided into the liquid ejecting head 110a including the head chip 111 and the drive circuit 112, and a control module 110b including the power supply circuit 113 and the drive signal generation circuit 114. The head unit 110 is not limited to the aspect of being divided into the liquid ejecting head 110a and the control module 110b, and for example, a part or all of the control module 110b may be incorporated in the liquid ejecting head 110a.

The head chip 111 ejects ink toward the print medium. In FIG. 2, among the components of the head chip 111, a plurality of drive elements 111f are typically shown. A detailed example of the head chip 111 will be described later with reference to FIG. 3.

In the example shown in FIG. 2, the head unit 110 has one head chip 111 in number, but the number may be two or more. When the liquid ejecting apparatus 100 is a serial type, one or more head chips 111 are arranged so that a plurality of nozzles are distributed over a part of the width direction of the print medium. Further, when the liquid ejecting apparatus 100 is a line type, two or more head chips 111 are arranged so that a plurality of nozzles are distributed over the entire width direction of the print medium.

The drive circuit 112 performs switching under the control of the processing circuit 150 as to whether or not to supply the drive signal Com output from the drive signal generation circuit 114 to each of the plurality of drive elements 111f of the head chip 111 as the drive pulse PD. The drive circuit 112 includes, for example, a group of switches such as a transmission gate for the switching.

The power supply circuit 113 receives electric power from a commercial power source (not shown) and generates various predetermined potentials. The various potentials generated are appropriately supplied to each portion of the liquid ejecting apparatus 100. In the example shown in FIG. 2, the power supply circuit 113 generates a power supply potential VHV and an offset potential VBS. The offset potential VBS is supplied to the head chip 111 and the like. Further, the power supply potential VHV is supplied to the drive signal generation circuit 114 and the like.

The drive signal generation circuit 114 is a circuit that generates a drive signal Com for driving each drive element 111f of the head chip 111. Specifically, the drive signal generation circuit 114 includes, for example, a digital-to-analog (DA) conversion circuit and an amplifier circuit. The drive signal generation circuit 114 generates the drive signal Com by the DA conversion circuit converting a waveform designation signal dCom described later from the processing circuit 150 from a digital signal to an analog signal, and the amplifier circuit amplifying the analog signal using the power supply potential VHV from the power supply circuit 113. Here, among the waveforms included in the drive signal Com, the signal of the waveform actually supplied to the drive element 111f is the drive pulse PD.

The moving mechanism 120 changes a relative position between the head unit 110 and the print medium. More specifically, when the liquid ejecting apparatus 100 is a serial type, the moving mechanism 120 includes a transport mechanism for transporting the print medium in a predetermined direction and a moving mechanism for repeatedly moving the head unit 110 along an axis orthogonal to the transport direction of the print medium. Further, when the liquid ejecting apparatus 100 is a line type, the moving mechanism 120 includes a transport mechanism for transporting the print medium in a direction intersecting a longitudinal direction of the elongated head unit 110.

The communication device 130 is a circuit capable of communicating with the first processing apparatus 200. For example, the communication device 130 is an interface such as a wireless or wired local area network (LAN) or a universal serial bus (USB). USB is a registered trademark. The communication device 130 may be connected to another first processing apparatus 200 through another network such as the Internet. Further, the communication device 130 may be integrated with the processing circuit 150.

The storage circuit 140 stores various programs executed by the processing circuit 150 and various data, such as the recorded data DP, processed by the processing circuit 150. The storage circuit 140 may include, for example, one or both semiconductor memories of one or more volatile memories such as random access memory (RAM) and one or more non-volatile memories such as read only memory (ROM), electrically erasable programmable read-only memory (EEPROM) or programmable ROM (PROM). The recorded data DP is supplied from, for example, the first processing apparatus 200. The storage circuit 140 may be built as a part of the processing circuit 150.

The processing circuit 150 has a function of controlling the operation of each portion of the liquid ejecting apparatus 100 and a function of processing various data. The processing circuit 150 includes, for example, one or more processors such as a central processing unit (CPU). The processing circuit 150 may include a programmable logic device such as a field-programmable gate array (FPGA) in place of the CPU or in addition to the CPU.

The processing circuit 150 controls the operation of each portion of the liquid ejecting apparatus 100 by executing a program stored in the storage circuit 140. Here, the processing circuit 150 generates signals such as a control signal Sk, a print data signal SI, and the waveform designation signal dCom as signals for controlling the operation of each portion of the liquid ejecting apparatus 100.

The control signal Sk is a signal for controlling the drive of the moving mechanism 120. The print data signal SI is a signal for controlling the drive of the drive circuit 112. Specifically, the print data signal SI specifies whether the drive circuit 112 supplies the drive signal Com from the drive signal generation circuit 114 to the drive element 111f as a drive pulse PD, for each predetermined unit period. By the specifying, the amount of ink ejected from the head chip 111 and the like are specified. The waveform designation signal dCom is a digital signal for defining the waveform of the drive signal Com generated by the drive signal generation circuit 114.

Figure 3:
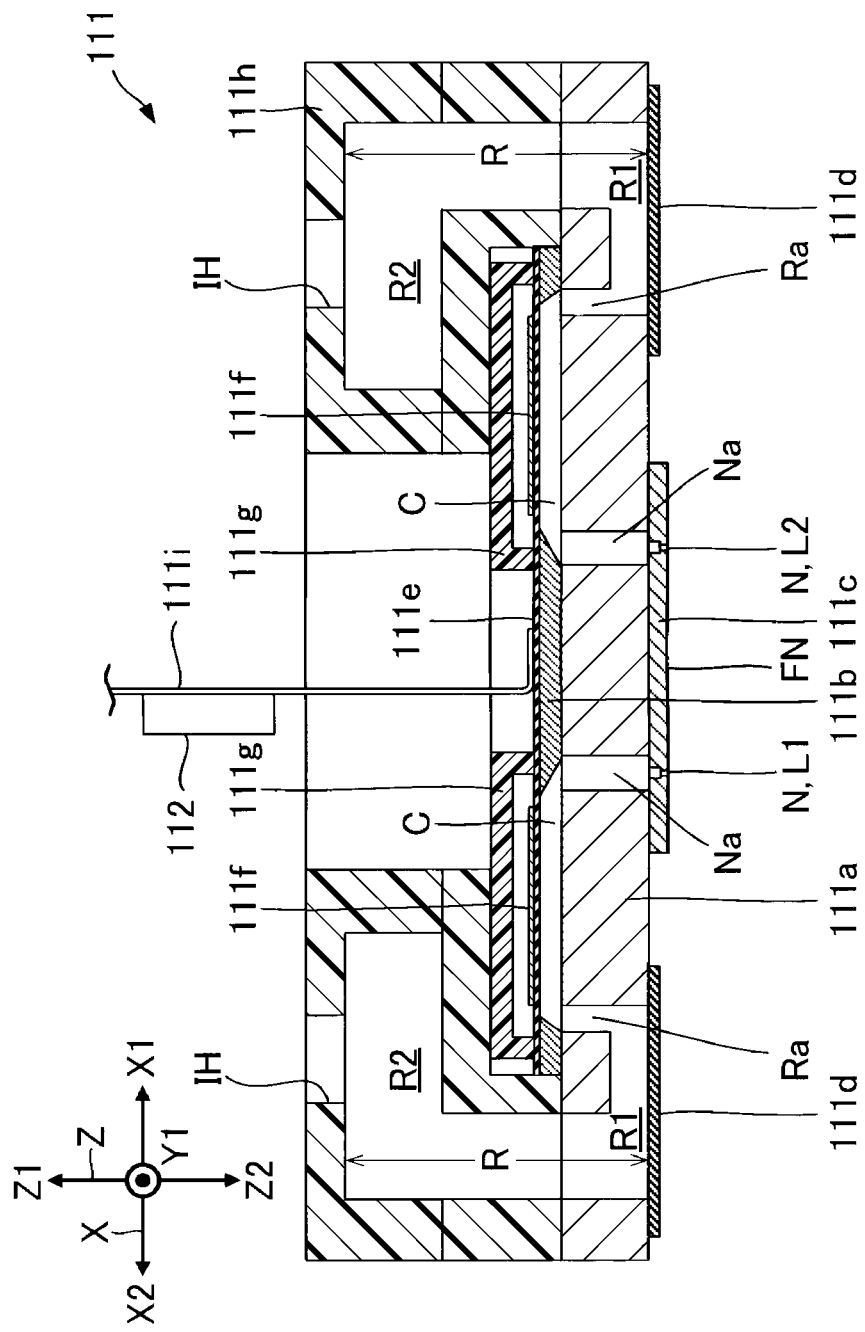
FIG. 3 is a cross-sectional view showing a configuration example of a head chip.

FIG. 3 is a cross-sectional view showing a configuration example of the head chip 111. In the following description, an X axis, a Y axis and a Z axis that intersect each other are appropriately used. In the following, one direction along the X axis is a X1 direction, and a direction opposite to the X1 direction is an X2 direction. Similarly, the directions opposite to each other along the Y axis are a Y1 direction and a Y2 direction. Opposite directions along the Z axis are a Z1 direction and a Z2 direction.

As shown in FIG. 3, the head chip 111 has a plurality of nozzles N arranged in a direction along the Y axis. The plurality of nozzles N are divided into a first row L1 and a second row L2 which are arranged at intervals in a direction along the X axis. Each of the first row L1 and the second row L2 is a set of a plurality of nozzles N linearly arranged in the direction along the Y axis.

The head chip 111 has a configuration substantially symmetrical with each other in the direction along the X axis. However, positions of the plurality of nozzles N in the first row L1 and the plurality of nozzles N in the second row L2 in the direction along the Y axis may match or differ from each other. FIG. 3 illustrates a configuration in which the positions of the plurality of nozzles N in the first row L1 and the plurality of nozzles N in the second row L2 in the direction along the Y axis match with each other.

As shown in FIG. 3, the head chip 111 includes a flow path substrates 111a, a pressure chamber substrate 111b, a nozzle plate 111c, vibration absorbing bodies 111d, a vibration plate 111e, a plurality of drive elements 111f, protective plates 111g, a case 111h, and a wiring substrate 111i.

The flow path substrate 111a and the pressure chamber substrate 111b are stacked in this order in the Z1 direction, and form a flow path for supplying ink to a plurality of nozzles N. The vibration plate 111e, the plurality of drive elements 111f, the protective plates 111g, the case 111h, and the wiring substrate 111i are installed in a region located in the Z1 direction with respect to the stack body formed by the flow path substrate 111a and the pressure chamber substrate 111b. On the other hand, the nozzle plate 111c and the vibration absorbing bodies 111d are installed in a region located in the Z2 direction with respect to the stack body. Each element of the head chip 111 is schematically a plate-shaped member elongated in the Y direction, and is joined to each other by, for example, an adhesive. Hereinafter, each element of the head chip 111 will be described in order.

The nozzle plate 111c is a plate-shaped member provided with a plurality of nozzles N in each of the first row L1 and the second row L2. Each of the plurality of nozzles N is a through hole through which ink is passed. Here, the surface of the nozzle plate 111c facing the Z2 direction is a nozzle surface FN. The nozzle plate 111c is manufactured by processing a silicon single crystal substrate by a semiconductor manufacturing technique using a processing technique such as dry etching or wet etching, for example. However, other known methods and materials may be appropriately used for manufacturing the nozzle plate 111c. Further, the cross-sectional shape of the nozzle is typically a circular shape, but the shape is not limited thereto, and may be a non-circular shape such as a polygon or an ellipse.

The flow path substrate 111a is provided with a space R1, a plurality of supply flow paths Ra, and a plurality of communication flow paths Na for each of the first row L1 and the second row L2. The space R1 is an elongated opening extending in the direction along the Y axis in a plan view in the direction along the Z axis. Each of the supply flow path Ra and the communication flow path Na is a through hole formed for each nozzle N. Each supply flow path Ra communicates with the space R1.

The pressure chamber substrate 111b is a plate-shaped member provided with a plurality of pressure chambers C referred to as cavities for each of the first row L1 and the second row L2. The plurality of pressure chambers C are arranged in the direction along the Y axis. Each pressure chamber C is an elongated space formed for each nozzle N and extending in the direction along the X axis in a plan view. Each of the flow path substrate 111a and the pressure chamber substrate 111b is manufactured by processing a silicon single crystal substrate by, for example, semiconductor manufacturing technique, in the same manner as the nozzle plate 111c described above. However, other known methods and materials may be appropriately used for the manufacturing of each of the flow path substrate 111a and the pressure chamber substrate 111b.

The pressure chamber C is a space located between the flow path substrate 111a and the vibration plate 111e. For each of the first row L1 and the second row L2, a plurality of the pressure chambers C are arranged in a direction along the Y axis. Further, the pressure chamber C communicates with each of the communication flow path Na and the supply flow path Ra. Therefore, the pressure chamber C communicates with the nozzle N through the communication flow path Na and communicates with the space R1 through the supply flow path Ra.

The vibration plate 111e is arranged on the surface of the pressure chamber substrate 111b facing the Z1 direction. The vibration plate 111e is a plate-shaped member that can elastically vibrate. The vibration plate 111e has, for example, a first layer and a second layer, which are stacked in the Z1 direction in this order. The first layer is, for example, an elastic film made of silicon oxide ($SiO_2$). The elastic film is formed, for example, by thermally oxidizing one surface of a silicon single crystal substrate. The second layer is, for example, an insulating film made of zirconium oxide ($ZrO_2$). The insulating film is formed by, for example, forming a zirconium layer by a sputtering method and thermally oxidizing the layer. The vibration plate 111e is not limited to the above-mentioned stacked configuration of the first layer and the second layer, and may be constituted by, for example, a single layer or three or more layers.

On the surface of the vibration plate 111e facing the Z1 direction, a plurality of drive elements 111f corresponding to the nozzles N are arranged for each of the first row L1 and the second row L2. Each drive element 111f is a passive element that is deformed by the supply of the drive signal. Each drive element 111f has an elongated shape extending in the direction along the X axis in a plan view. The plurality of drive elements 111f are arranged in the direction along the Y axis to correspond to the plurality of pressure chambers C. The drive element 111f overlaps the pressure chamber C in a plan view.

Each drive element 111f is a piezoelectric element, and although not shown, it has a first electrode, a piezoelectric layer, and a second electrode, which are stacked in the Z1 direction in this order. One of the first electrode and the second electrode is an individual electrode arranged apart from other first electrodes for each drive element 111f, and a drive pulse PD is supplied to the one electrode. The other electrode of the first electrode and the second electrode is a band-shaped common electrode extending in the direction along the Y axis to be continuous over the plurality of drive elements 111f, and the offset potential VBS is supplied to the other electrode. Examples of the metal material of the electrodes include metal materials such as platinum (Pt), aluminum (Al), nickel (Ni), gold (Au), and copper (Cu), and of the materials, one type can be used alone or two or more types can be used in combination in an alloyed or stacked manner. The piezoelectric layer is made of a piezoelectric material such as lead zirconate titanate ($Pb(Zr, Ti)O_3$), and has, for example, a band shape extending in the direction along the Y axis be continuous over the plurality of drive elements 111f. However, the piezoelectric layer may be integrated over the plurality of drive elements 111f. In this case, the piezoelectric layer is provided with a through hole penetrating the piezoelectric layer extending in the direction along the X axis in a region corresponding to the gap between the pressure chambers C adjacent to each other in a plan view. When the vibration plate 111e vibrates in conjunction with the above deformation of the drive elements 111f, the pressures in the pressure chambers C fluctuate, and ink is ejected from the nozzles N.

The protective plates 111g are a plate-shaped members installed on the surface of the vibration plate 111e facing the Z1 direction, and protect the plurality of drive elements 111f and reinforce the mechanical strength of the vibration plate 111e. Here, the plurality of drive elements 111f are accommodated between the protective plates 111g and the vibration plate 111e. The protective plates 111g are made of, for example, a resin material.

The case 111h is a member for storing ink supplied to a plurality of pressure chambers C. The case 111h is made of, for example, a resin material. The case 111h is provided with a space R2 for each of the first row L1 and the second row L2. The space R2 is a space communicating with the above-mentioned space R1 and functions as a reservoir R for storing ink supplied to a plurality of pressure chambers C together with the space R1. The case 111h is provided with an introduction port IH for supplying ink to each reservoir R. The ink in each reservoir R is supplied to the pressure chamber C through each supply flow path Ra.

The vibration absorbing body 111d, also referred to as a compliance substrate, is a flexible resin film constituting a wall surface of the reservoir R, and absorbs pressure fluctuations of ink in the reservoir R. The vibration absorbing body 111d may be a thin plate made of metal and having flexibility. The surface of the vibration absorbing body 111d facing the Z1 direction is joined to the flow path substrate 111a with an adhesive or the like.

The wiring substrate 111i is mounted on the surface of the vibration plate 111e facing the Z1 direction, and is a mounting component for electrically coupling the head chip 111, the drive circuit 112, the control module 110b, and the like. The wiring substrate 111i is a flexible wiring substrate such as a chip on film (COF), a flexible printed circuit (FPC) or a flexible flat cable (FFC). The drive circuit 112 described above is mounted on the wiring substrate 111i of the present embodiment.

1-3. Configuration of First Processing Apparatus

Figure 4:
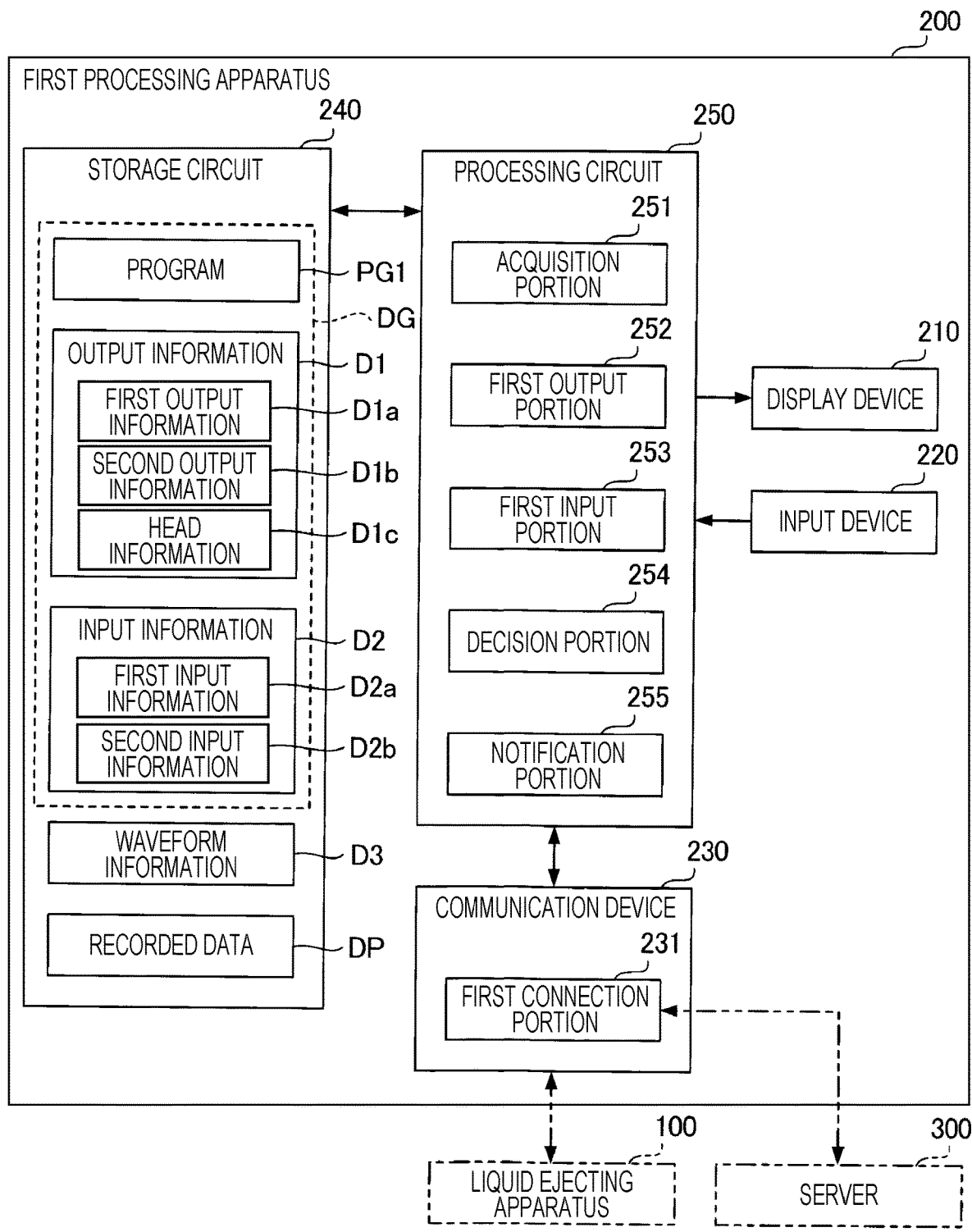
FIG. 4 is a schematic diagram showing a configuration example of a first processing apparatus used in the liquid ejecting system according to the first embodiment.

FIG. 4 is a schematic diagram showing a configuration example of the first processing apparatus 200 used in the liquid ejecting system 10 according to the first embodiment. As shown in FIG. 4, the first processing apparatus 200 includes a display device 210, an input device 220, a communication device 230, a storage circuit 240, and a processing circuit 250. The components are communicably connected to each other.

The display device 210 displays various images under the control of the processing circuit 250. Here, the display device 210 includes various display panels such as a liquid crystal display panel or an organic electro-luminescence (EL) display panel, for example. The display device 210 may be provided outside the first processing apparatus 200. Further, the display device 210 may be a component of the liquid ejecting apparatus 100.

The input device 220 is a device that receives operations from the user. For example, the input device 220 has a pointing device such as a touch pad, a touch panel or a mouse. Here, when the input device 220 has a touch panel, the input device 220 may also serve as a display device 210. The input device 220 may be provided outside the first processing apparatus 200. Further, the input device 220 may be a component of the liquid ejecting apparatus 100. Further, the input device 220 may include an image capturing device having a charge coupled device (CCD) image sensor, a complementary MOS (CMOS) image sensor, or the like.

The communication device 230 is a circuit capable of communicating with each of the liquid ejecting apparatus 100 and the server 300. For example, the communication device 230 is an interface such as a wireless or wired LAN or USB. The communication device 230 transmits the recorded data DP to the liquid ejecting apparatus 100 by communicating with the liquid ejecting apparatus 100. Further, the communication device 230 transmits the output information D1 and receives the input information D2 by communicating with the server 300. That is, the communication device 230 functions as a first connection portion 231 that is communicably connected to the server 300. The communication device 230 may be integrated with the processing circuit 250.

The storage circuit 240 is a device that stores various programs executed by the processing circuit 250 and various data processed by the processing circuit 250. The storage circuit 240 has, for example, a hard disk drive or a semiconductor memory. A part or all of the storage circuit 240 may be provided in a storage device or a server outside the first processing apparatus 200.

The storage circuit 240 of the present embodiment stores a program PG1, the output information D1, the input information D2, the waveform information D3, and the recorded data DP. Some or all of the program PG1, the output information D1, the input information D2, and the waveform information D3 may be stored in a storage device or server outside the first processing apparatus 200. Further, in the following, the program PG1, the output information D1, the input information D2, and the waveform information D3 may be collectively referred to as information DG.

The program PG1 is a program that causes a computer to implement various functions necessary for deciding the waveform of the drive pulse PD based on the input information D2.

The output information D1 is information regarding the degree of deterioration of the drive element $111f$. The output information D1 is information on which deterioration of the drive element $111f$ can be estimated by the server 300. In other words, the output information D1 is information indicating a variable that changes with the degree of deterioration of the drive element $111f$.

In the example shown in FIG. 4, the output information D1 includes first output information D1$a$, second output information D1$b$, and head information D1$c$.

The first output information D1$a$ is information regarding the number of times that the drive element $111f$ is driven. The number of times is, for example, the number of times of driving integrated from the start of use of the drive element $111f$. The first output information D1$a$ is not limited to the information regarding the number of times of driving, and may be, for example, the driving time integrated from the start of use of the drive element $111f$.

The second output information D1$b$ is information regarding the amount corresponding to the amount of deterioration of the drive element $111f$ of per drive. The second output information D1$b$ may include information regarding an amount corresponding to the amount of deterioration of the drive element $111f$ per drive, and is, for example, information regarding the waveform of the drive pulse PD supplied to the drive element $111f$. The second output information D1$b$ is not limited to the information of the waveform itself, and may be, for example, information about only one or both of the voltage value of the drive pulse PD and the reference voltage.

The head information D1$c$ is information regarding the type of the head unit 110. More specifically, the head information D1$c$ may be any information that can identify the type of the head unit 110, and examples thereof may include identification information such as a serial number unique to the head unit 110 or the liquid ejecting head 110$a$.

In addition to the above-mentioned information, information regarding other usage conditions of the head unit 110 may be added to the output information D1. Examples of the information regarding the other usage conditions include information regarding the type of liquid used for ejection in the head unit 110, information regarding the temperature of the head unit 110, and the like. The Information regarding the type of liquid used for ejection in the head unit 110 includes, for example, information regarding a product number, viscosity, residual vibration, ejection speed, and the like, of the ink. Examples of the information regarding the temperature of the head unit 110 include information regarding the detection temperature of a temperature sensor provided around the head unit 110. Further, the temperature of the ink in the vicinity of the pressure chambers C may be detected by using some of the drive elements $111f$, and the information regarding the detection temperature may be used as the information regarding the temperature of the head unit 110.

The input information D2 is information including information regarding a waveform of the drive pulse PD after correction or a correction value for correction thereof. The input information D2 is provided from the server 300 to the first processing apparatus 200 as described above. In the example shown in FIG. 4, the input information D2 includes the first input information D2$a$ and the second input information D2$b$.

The first input information D2$a$ is information regarding a waveform candidate or information for correcting a reference waveform. In the present embodiment, the first input information D2$a$ is correction information D5 to be described later, which is information for correcting the reference waveform that is the reference of the waveform of the drive pulse PD. The case where the first input information D2$a$ is information regarding the waveform candidate will be described in a fifth embodiment.

The second input information D2$b$ is information for notifying the user of the determination result of deterioration of the drive element $111f$. The second input information D2$b$ may include, for example, information indicating whether or not the current degree of deterioration of the drive element $111f$ is equal to or higher than a predetermined degree, more specifically, information indicating that the current degree of deterioration of the drive element $111f$ reaches the limit of use of the drive element $111f$, information indicating the remaining time until the degree of deterioration of the drive element $111f$ reaches the limit of use of the drive element $111f$, information indicating that the degree of deterioration of the drive element $111f$ progresses to the extent to which correction of the waveform of the drive pulse PD is not possible, information indicating a replacement timing of the liquid ejecting head 110$a$ due to the deterioration of the drive element $111f$, or the like.

The waveform information D3 is information regarding the waveform of the drive pulse PD supplied to the drive element $111f$. The waveform information D3 is usually decided by the manufacturer of the printer main body, but may be decided by the manufacturer of the head. The waveform information D3 is used, for example, to generate the waveform designation signal dCom in the above-mentioned processing circuit 150. That is, the waveform indicated by the waveform information D3 is used as the waveform of the drive pulse PD, as needed. The details of the waveform of the drive pulse PD will be described later with reference to FIG. 7. Further, as will be described later, the waveform information D3 is updated based on the input information D2 with the use of the drive element $111f$.

The processing circuit 250 is a device having a function of controlling each portion of the first processing apparatus 200 and a function of processing various data. The processing circuit 250 has, for example, a processor such as a central processing unit (CPU). The processing circuit 250 may be constituted by a single processor or may be constituted by a plurality of processors. In addition, some or all of the functions of the processing circuit 250 are implemented by hardware such as a digital signal processor (DSP), an application specific integrated circuit (ASIC), a programmable logic device (PLD), a field programmable gate array (FPGA).

The processing circuit 250 functions as an acquisition portion 251, a first output portion 252, a first input portion 253, a decision portion 254, and a notification portion 255 by reading the program PG1 from the storage circuit 240 and executing the program PG1.

The acquisition portion 251 acquires the output information D1. In the present embodiment, the acquisition portion 251 acquires the first output information D1a, the second output information D1b, and the head information D1c. For example, the acquisition portion 251 has a function of counting the number of times that the drive element 111f is driven and storing or reading information about the count value in the storage circuit 240, and acquires the first output information D1a by using the function. Further, for example, the acquisition portion 251 has a function of reading information regarding the waveform of the drive pulse PD from the storage circuit 240 or the like, and acquires the second output information D1b by using the function. Further, for example, the acquisition portion 251 has a function of receiving information regarding the type of the liquid ejecting head 110a through the input device 220, and acquires the head information D1c by using the function. The acquired output information D1 is stored in the storage circuit 240 as described above. When identification information such as a serial number is stored in a memory (not shown) provided in the liquid ejecting head 110a, the acquisition portion 251 may acquire the head information D1c by reading the identification information.

The first output portion 252 outputs the output information D1 through the first connection portion 231. For example, the first output portion 252 outputs the output information D1 to the server 300 through the first connection portion 231, by using an instruction or the like issued by a user using the input device 220 as a trigger.

The input information D2 is input to the first input portion 253 through the first connection portion 231. For example, the input information D2 is input from the server 300 to the first input portion 253 through the first connection portion 231, by using an instruction or the like issued by the user using the input device 220 as a trigger.

The decision portion 254 decides the waveform of the drive pulse PD based on the first input information D2a which is the correction information D5. Here, the decision portion 254 stores the information regarding the decided waveform in the storage circuit 240 as the waveform information D3.

The notification portion 255 notifies the user of the determination result of deterioration of the drive element 111f based on the second input information D2b. For example, the notification portion 255 performs the notification by causing the display device 210 to display an image showing the determination result, by using the input of the second input information D2b by the first input portion 253 as a trigger.

1-4. Configuration of Server

Figure 5:
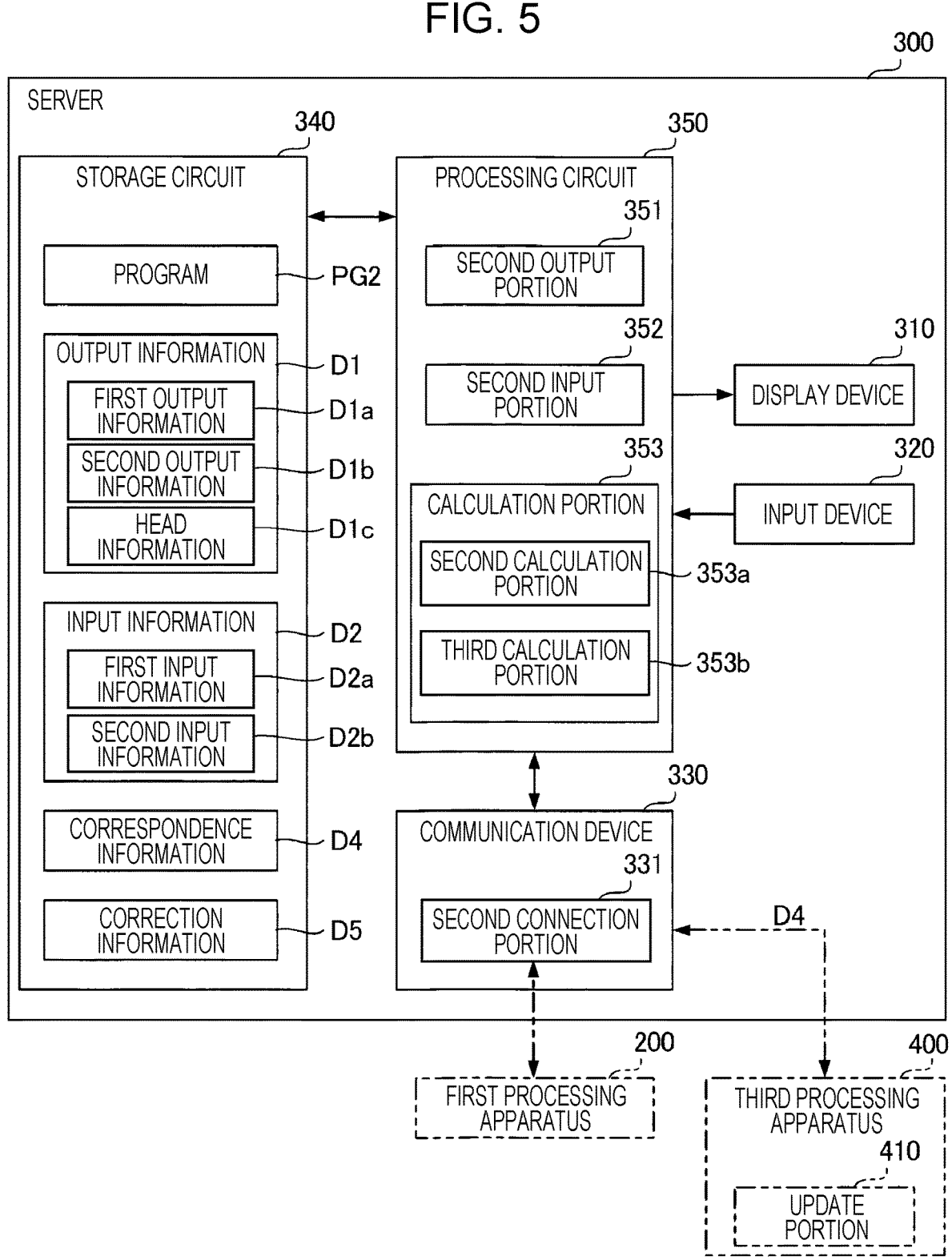
FIG. 5 is a schematic diagram showing a configuration example of a server used in the liquid ejecting system according to the first embodiment.

FIG. 5 is a schematic diagram showing a configuration example of the server 300 used in the liquid ejecting system 10 according to the first embodiment. As shown in FIG. 5, the server 300 includes a display device 310, an input device 320, a communication device 330, a storage circuit 340, and a processing circuit 350. The components are communicably connected to each other. The storage circuit 340 is an example of a "storage portion".

The display device 310 is a device that displays various images under the control of the processing circuit 350, and is configured in the same manner as the display device 210 described above. The input device 320 is a device that receives an operation from the user, and is configured in the same manner as the input device 220 described above. The communication device 330 is a circuit capable of communicating with each first processing apparatus 200, and is configured in the same manner as the communication device 230 as described above. The communication device 330 may be integrated with the processing circuit 350.

Here, the communication device 330 receives the output information D1 and transmits the input information D2 by communicating with the first processing apparatus 200. That is, the communication device 330 functions as a second connection portion 331 that is communicably connected to the first connection portion 231. Further, the communication device 330 transmits the output information D1 and receives waveform candidate information D6 by communicating with the third processing apparatus 400, as needed.

The storage circuit 340 is a device that stores various programs executed by the processing circuit 350 and various data processed by the processing circuit 350, and is configured in the same manner as the storage circuit 240 described above. The storage circuit 340 stores the program PG2, the output information D1, the input information D2, the correspondence information D4, and the correction information D5.

The program PG2 is a program that enables a computer to implement various functions necessary for generating input information D2 based on output information D1. The correspondence information D4 is information regarding the correspondence relationship between the degree of deterioration of the drive element 111f and the waveform of the drive pulse PD. The details of the correspondence information D4 will be described later with reference to FIGS. 8 and 9.

The correction information D5 is information for correcting the reference waveform which is the reference of the waveform of the drive pulse PD. For example, the correction information D5 indicates a correction value for correcting the reference waveform. The correction value is, for example, a value indicating the mount of increase in a voltage $\Delta E$ or a second potential E3 to be described later, or a value indicating the amount of decrease in a second period T2 to be described later. The correction value is not particularly limited as long as it is a value indicating an element that can correct the amount of ejection among the elements that define the waveform of the drive pulse PD. For example, the correction value may be a value related to a potential other than the second potential E3 of the drive pulse PD, or may be a value related to a fall time of the drive pulse PD from a predetermined potential.

The processing circuit 350 is a device having a function of controlling each portion of the server 300 and a function of processing various data, and is configured in the same manner as the processing circuit 250 described above. The processing circuit 350 functions as a second output portion 351, a second input portion 352, and a calculation portion 353 by reading the program PG2 from the storage circuit 340 and executing the program PG2.

The second output portion 351 outputs the input information D2 through the second connection portion 331. For example, the second output portion 351 outputs the input information D2 to the first processing apparatus 200 through the second connection portion 331, by using an instruction or the like issued by the user using the input device 220 as a trigger.

The output information D1 is input to the second input portion 352 through the second connection portion 331. For example, the output information D1 is input from the first processing apparatus 200 to the second input portion 352 through the second connection portion 331, by using an instruction or the like by the user using the input device 220 as a trigger.

The calculation portion 353 performs a calculation for generating the input information D2 based on the output information D1. In the present embodiment, the calculation portion 353 determines the degree of deterioration of the drive element 111f based on the output information D1, and generates the first input information D2a which is the correction information D5 based on the determination result. As described above, the calculation portion 353 functions as the second calculation portion 353a that performs the calculation for generating the correction information D5, and also functions as the third calculation portion 353b that performs the calculation for determining the degree of deterioration of the drive element 111f.

Here, the determination result made by the third calculation portion 353b is used as the second input information D2b. That is, the third calculation portion 353b generates information indicating the result of the determination as the second input information D2b. In addition to the information indicating the degree of deterioration of the drive element 111f, the third calculation portion 353b may generate information indicating whether or not the degree of deterioration of the drive element 111f is equal to or higher than a predetermined degree.

Further, in addition to the output information D1, the correspondence information D4 is appropriately used for the calculation in the calculation portion 353. That is, the calculation portion 353 functions as a "fourth calculation portion" that performs the calculation to generate the input information D2 based on the output information D1 and the correspondence information D4. Here, the calculation portion 353 receives the input of the new correspondence information D4 from the third processing apparatus 400 depending on the collation result between the output information D1 and the correspondence information D4, and generates the input information D2 by using the new correspondence information D4 from the third processing apparatus 400.

More specifically, when the degree of deterioration indicated by the output information D1 is included in the degree of deterioration indicated by the correspondence information D4, the calculation portion 353 generates, as the correction information D5 or the input information D2, information regarding the correction value corresponding to the degree of deterioration that matches with the degree of deterioration indicated by the output information D1 in the degree of deterioration indicated by the correspondence information D4.

Further, when the degree of deterioration indicated by the output information D1 is not included in the degree of deterioration indicated by the correspondence information D4, the calculation portion 353 generates, as the correction information D5 or the input information D2, information regarding the correction value corresponding to the degree of deterioration that is closest to the degree of deterioration indicated by the output information D1 in the degree of deterioration indicated by the correspondence information D4.

However, when the difference between the closest degree of deterioration and the degree of deterioration indicated by the output information D1 is more than a predetermined degree, or when it is difficult to extract the closest degree of deterioration from the degree of deterioration indicated by the correspondence information D4, it is difficult to generate appropriate correction information D5 or the input information D2. Therefore, in this case, the calculation portion 353 outputs the output information D1 to the third processing apparatus 400, and then receives the input of new correspondence information D4. Then, the calculation portion 353 generates the correction information D5 or the input information D2 by using the new correspondence information D4. The correspondence information D4 stored in the storage circuit 340 is rewritten with the new correspondence information D4.

Here, the third processing apparatus 400 uses the output information D1 from the server 300 to generate the new correspondence information D4. That is, the third processing apparatus 400 has an update portion 410 that updates the correspondence information D4. The update portion 410 updates the correspondence information D4 by appropriately using information input from an operator of the third processing apparatus 400 or an administrator of the liquid ejecting system 10 in addition to the output information D1 and the correspondence information D4. Further, the update portion 410 transmits, to the server 300, the updated correspondence information D4. When the third processing apparatus 400 does not have original correspondence information D4, the third processing apparatus 400 may update the correspondence information D4 after receiving the input of the correspondence information D4 from the server 300 in addition to the output information D1.

1-5. Process of Liquid Ejecting System

Figure 6:
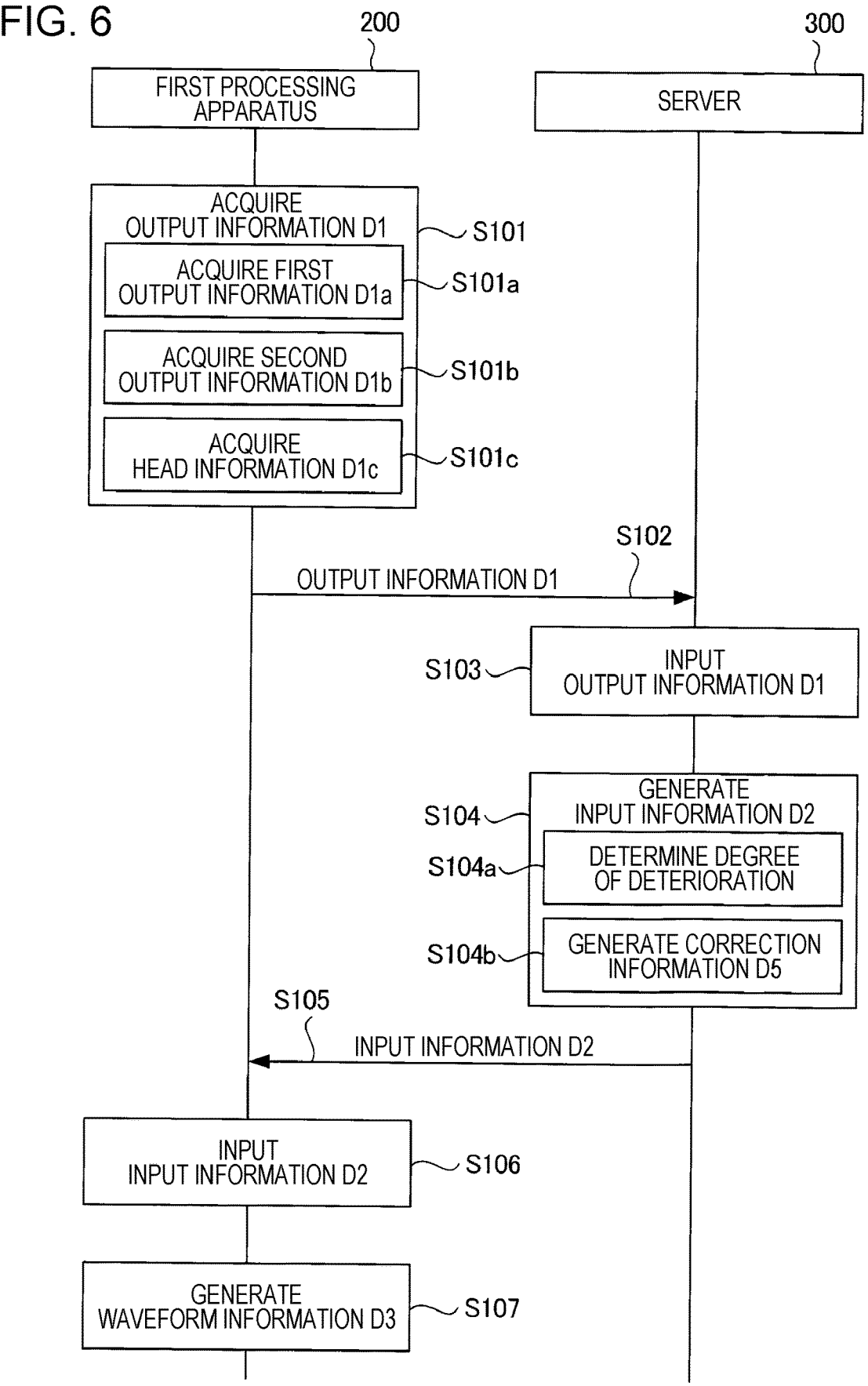
FIG. 6 is a flowchart showing a process of the liquid ejecting system according to the first embodiment.

FIG. 6 is a flowchart showing a process of the liquid ejecting system 10 according to the first embodiment. In the liquid ejecting system 10, first, as shown in FIG. 6, in step S101, the first processing apparatus 200 acquires the output information D1.

Specifically, step S101 includes step S101a, step S101b, and step S101c. In step S101a, for example, the acquisition portion 251 acquires the first output information D1a by reading the information regarding the count value of the number of times that the drive element 111f is driven from the storage circuit 240. Further, in step S101b, for example, the acquisition portion 251 acquires the second output information D1b by reading the information regarding the waveform of the drive pulse PD from the storage circuit 240 or the like. Further, in step S101c, for example, the acquisition portion 251 acquires the head information D1c by receiving information regarding the type of the liquid ejecting head 110a through the input device 220. The order of step S101a, step S101b, and step S101c is not limited to the order shown in FIG. 6, and any order is possible. Further, the acquisition portion 251 may display, for example, an image for a graphical user interface (GUI) for inputting information necessary for acquiring the output information D1 on the display device 210, and use the image to appropriately receive information necessary for acquiring the output information D1 from the user.

Then, in step S102, the first processing apparatus 200 outputs the output information D1 to the server 300.

Specifically, in step S102, the first output portion 252 outputs the output information D1 through the first connection portion 231 by using the acquisition of the output information D1 as a trigger. A timing at which the output information D1 is output to the first connection portion 231 is not limited to the time when the output information D1 is acquired. For example, the first output portion 252 may transmit authentication information such as account information and a password for the user to the server 300 when the input using the above-mentioned image for the GUI is received, the server 300 may transmit output permission information to the first processing apparatus 200 when the server 300 succeeds in the authentication using the authentication information, and the first output portion 252 may output the output information D1 to the server 300 when the output permission information is received by the first processing apparatus 200.

Next, in step S103, the server 300 inputs the output information D1. Then, in step S104, the server 300 generates the input information D2 based on the output information D1. The server 300 may compare the head information D1c with predetermined comparison information, and may cancel the processing after step S104 depending on the comparison result. Further, depending on the inquiry result, the output information D1 indicating that the correction is not to be performed may be output to the first output portion 252.

In the present embodiment, step S104 includes step S104a and step S104b. In step S104a, the third calculation portion 353b performs the calculation for determining the degree of deterioration of the drive element 111f. In step S104b, the second calculation portion 353a performs the calculation to generate the correction information D5 as the first input information D2a. The correspondence information D4 is used for the above-mentioned calculations. The details of the correspondence information D4 will be described later with reference to FIGS. 8 and 9.

Then, in step S105, the server 300 outputs the input information D2 to the first processing apparatus 200.

Next, in step S106, the first processing apparatus 200 inputs the input information D2. Specifically, in step S106, the input information D2 from the server 300 is input to the first input portion 253 through the first connection portion 231. The first input portion 253 may notify the user of whether or not the input information D2 is input from the server 300 by using the display device 210 or the like, and the input information D2 from the server 300 may be input only when the user inputs an instruction to permit input by the input device 220 or the like.

Then, in step S107, the first processing apparatus 200 generates the waveform information D3 based on the input information D2. That is, in step S107, the decision portion 254 decides the waveform of the drive pulse PD based on the input information D2. In the present embodiment, the first input information D2a is the correction information D5. Therefore, specifically, in step S107, the decision portion 254 generates the waveform information D3 by correcting the reference waveform based on the first input information D2a. Further, in step S107, the notification portion 255 performs notification based on the second input information D2b as needed.

The decision portion 254 may fine-tune the waveform after correction using the first input information D2a by user input using the input device 220, and then decide the fine-tuned waveform as the waveform of the drive pulse PD to be actually used. Alternatively, even when the decision portion 254 first decides the waveform after correction using the first input information D2a as it is, as the waveform of the drive pulse PD to be actually used, the decision portion 254 may adjust the waveform of the drive pulse PD to increase the amplitude of the drive pulse PD when a usage period based on the number of times of ink ejection from the head unit 110 or the like is equal to or higher than threshold value.

1-6. Process in Calculation Portion

Figure 7:
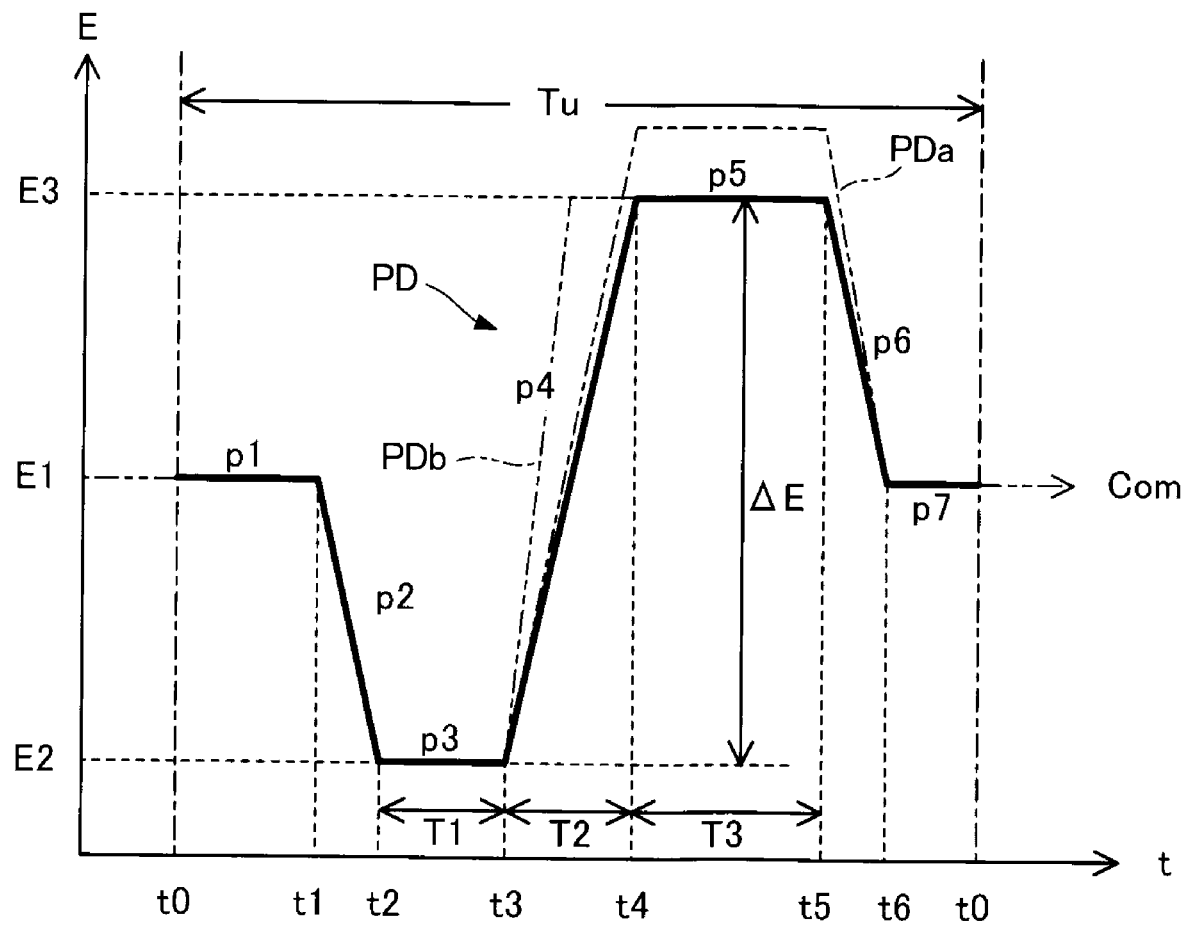
FIG. 7 is a diagram showing an example of a waveform of a drive pulse.

FIG. 7 is a diagram showing an example of the waveform of the drive pulse PD. FIG. 7 shows a change over time in a potential of the drive pulse PD, that is, a voltage waveform of the drive pulse PD. The waveform of the drive pulse PD is not limited to the example shown in FIG. 7, and any waveform is possible.

As shown in FIG. 7, the drive pulse PD is included in the drive signal Com for each unit period Tu. In the example shown in FIG. 7, a potential E of the drive pulse PD rises from potential E1, which is a reference potential, to a first potential E2, decreases to a second potential E3 lower than the potential E1, and then returns to the potential E1.

More specifically, the potential E of the drive pulse PD is first maintained at the potential E1 over the period from a timing t0 to a timing t1, and then drops to the first potential E2 over the period from the timing t1 to a timing t2. Then, the potential E of the drive pulse PD is maintained at the first potential E2 over a first period T1 from the timing t2 to a timing t3, and then rises to the second potential E3 over a second period T2 from the timing t3 to a timing t4. Then, it is maintained at the second potential E3 over a third period T3 from the timing t4 to a timing t5, and then drops to the potential E1 over the period from the timing t5 to a timing t6.

The drive pulse PD having such a waveform increases the pressure chamber C in the period from the timing t1 to the timing t2, and sharply decreases the volume of the pressure chamber C in the second period T2. Due to such a change in the volume of the pressure chamber C, a part of the ink in the pressure chamber C is ejected as droplets from the nozzle.

The waveform of the drive pulse PD as described above can be represented by a function using the parameters p1, p2, p3, p4, p5, p6, and p7 corresponding to the above-mentioned periods, respectively. When the waveform of the drive pulse PD is defined by the function, the waveform of the drive pulse PD can be adjusted by changing each of the parameters. By adjusting the waveform of the drive pulse PD, the ink ejection characteristics from the head unit 110 can be adjusted.

For example, the amount of ejection from the nozzle N can be increased by increasing the voltage $\Delta E$, which is the difference between the first potential E2 and the second potential E3, or increasing the second potential E3. Further, by shortening the length of the second period T2, the amount of ejection from the nozzle N can be increased. In FIG. 7, the reference waveform of the drive pulse PD is shown by a solid line, and each of a waveform PDa when the second potential E3 is larger than the reference waveform and a waveform PDb when the length of the second period T2 is shorter than the reference waveform is shown by a two-dot chain line.

As described above, the calculation portion 353 generates the input information D2 based on the output information D1 and the correspondence information D4. Hereinafter, an example of the correspondence information D4 will be described with reference to FIGS. 8 and 9. It is to be noted that, in FIGS. 8 and 9, for convenience of description, simplified correspondence information D4 is shown. Actually, the information that is more subdivided or optimized than the information shown in FIGS. 8 and 9 is used as the correspondence information D4.

FIG. 8 is a diagram showing an example of a first table TBL1 included in the correspondence information D4. FIG. 9 is a diagram showing an example of a second table TBL2 included in the correspondence information D4. The correspondence information D4 includes the first table TBL1 shown in FIG. 8 and the second table TBL2 shown in FIG. 9.

Here, although not shown, a plurality of the first tables TBL1 and the second tables TBL2 are prepared for each type or characteristic of the liquid ejecting head 110*a*. Usually, the progress rate of deterioration of the drive element 111*f* varies depending on the type of the liquid ejecting head 110*a*. Therefore, a plurality of first table TBL1 and second table TBL2 different from each other are prepared for each type of the liquid ejecting head 110*a*.

As shown in FIG. 8, the first table TBL1 shows a correspondence relationship between the combination of the number of times that the drive element 111*f* is driven and the potential of the drive pulse PD and the degree of deterioration of the drive element 111*f*. The deterioration of the drive element 111*f* progresses as the number of times of driving increases. Therefore, in the first table TBL1, the correspondence shows that the degree of deterioration of the drive element 111*f* increases as the number of times that the drive element 111*f* is driven increases. Further, the drive element 111*f* deteriorates as the amount of electric power supplied increases. Therefore, the first table TBL1 is set so that the higher the potential of the drive pulse PD, the greater the degree of deterioration of the drive element 111*f*. When the type of the liquid ejecting head 110*a* is such that the drive element 111*f* is easily deteriorated, as the first table TBL1, a table having larger numerical values indicating the degree of deterioration than those shown in FIG. 8 can be used.

In the example shown in FIG. 8, the number of times of driving is divided into five divisions; among the two divisions selected from the five divisions, the number of times in a smaller division is an example of the "first number of times", and the number of times in a larger division is an example of the "second number of times". Further, in the example shown in FIG. 8, the potential is divided into five divisions; among the two divisions selected from the five divisions, the potential in a smaller division is an example of the "first amount", and the potential in a larger division is an example of the "second amount".

Here, when the degree of deterioration corresponding to the first number of times and the first amount and the degree of deterioration corresponding to the second number of times and the second amount are different from each other, the smaller degree of deterioration is one example of the "the third degree" or "the fifth degree", and the larger degree of deterioration is an example of the "fourth degree" or the "sixth degree".

The above first table TBL1 is used to determine the degree of deterioration of the drive element 111*f*. Specifically, the above-mentioned third calculation portion 253*b* determines the degree of deterioration of the drive element 111*f* based on the first output information D1*a*, the second output information D1*b*, and the first table TBL1. That is, the third calculation portion 253*b* determines the degree of deterioration of the drive element 111*f* by collating the number of times of driving indicated by the first output information D1*a* and the potential indicated by the second output information D1*b* with the first table TBL1. Here, the third calculation portion 253*b* selects and uses the first table TBL1 corresponding to the type indicated by the head information D1*c* from among a plurality of first tables TBL1 for each type of the liquid ejecting head 110*a*. Further, the information indicating the determination result obtained by the third calculation portion 253*b* is used as the second input information D2*b*.

As shown in FIG. 9, the second table TBL2 shows a correspondence relationship between the degree of deterioration of the drive element 111*f* and the correction value of the waveform of the drive pulse PD. The second table TBL2 shows that the correction value of the waveform of the drive pulse PD increases as the degree of deterioration of the drive element 111*f* increases. The correction value is, for example, a value indicating an amount corresponding to the amount of increase in the voltage ΔE or the second potential E3 of the drive pulse PD shown in FIG. 7 described above, or a value indicating an amount corresponding to the amount of decrease in the second period T2 of the drive pulse PD. When the degree of deterioration is not so large, the degree of deterioration of the ejection characteristics is small; however, when the degree of deterioration is large to some extent, the degree of deterioration of the ejection characteristics increases at an accelerating rate as the degree of deterioration progresses. Therefore, the second table TBL2 shown in FIG. 9 is set so that the change in the correction value becomes small as the degree of deterioration becomes small, and the change in the correction value increases as the degree of deterioration increases. For example, in the second table TBL2, when the degrees of deterioration are 0, 1, and 2, the correction values are 0, 1, and 2, respectively, and the change in the correction value with the progress of the degree of deterioration is small, whereas when the degree of deterioration are 13, 14, and 15, the correction values are 42, 53, and 67, respectively, and the change in the correction value with the progress of the degree of deterioration becomes large. Further, when the type of the liquid ejecting head 110*a* is such that the deterioration of the ejection characteristics due to the deterioration of the drive element 111*f* is likely to be large, as the second table TBL2, a table having larger numerical values indicating the correction value than those shown in FIG. 9 can be used.

In FIG. 9, a value indicating how much the ΔE is increased with respect to the voltage ΔE of the drive pulse PD (the second voltage E3 may be used, but it is described by ΔE here for simplicity) is shown as the correction value. For example, when the correction value becomes "0", ΔE is increased by 0%, that is, the drive pulse PD is not changed. Further, for example, when the correction value becomes "67", ΔE is increased by 67%, that is, the drive pulse PD is corrected so that ΔE becomes 1.67×ΔE. Here, the case where the voltage ΔE is increased has been described, but when the second period T2 is decreased, for example, when the correction value becomes "9", the second period T2 is decreased by 9%, that is, the second period T2 is corrected to become 91%.

In the example shown in FIG. 9, the degree of deterioration is indicated by 16 numerical values so that the larger the degree of deterioration is, the larger the numerical value is; however, among any two numerical values selected from the 16 numerical values, the degree of deterioration indicated by the smaller numerical value is an example of the "first degree", and the degree of deterioration indicated by the larger numerical value is an example of the "second degree". Here, the correction amount indicated by the correction value corresponding to the first degree is an example of the "first correction amount" or the "third correction value", and the correction amount indicated by the correction value corresponding to the second degree is an example of the "second correction amount" or the "fourth correction value".

The above-mentioned second table TBL2 is used to generate a correction value of the waveform of the drive pulse PD. Specifically, the above-mentioned second calculation portion 253a obtains a correction value of the waveform of the drive pulse PD based on the degree of deterioration determined by using the first table TBL1 and the second table TBL2, and uses the correction value to generate the correction information D5. Here, the second calculation portion 253a selects and uses the second table TBL2 corresponding to the type indicated by the head information D1c from among a plurality of second tables TBL2 for each type of the liquid ejecting head 110a. Further, the information indicating the determination result obtained by the second calculation portion 253a is used as the first input information D2a.

Figure 10:
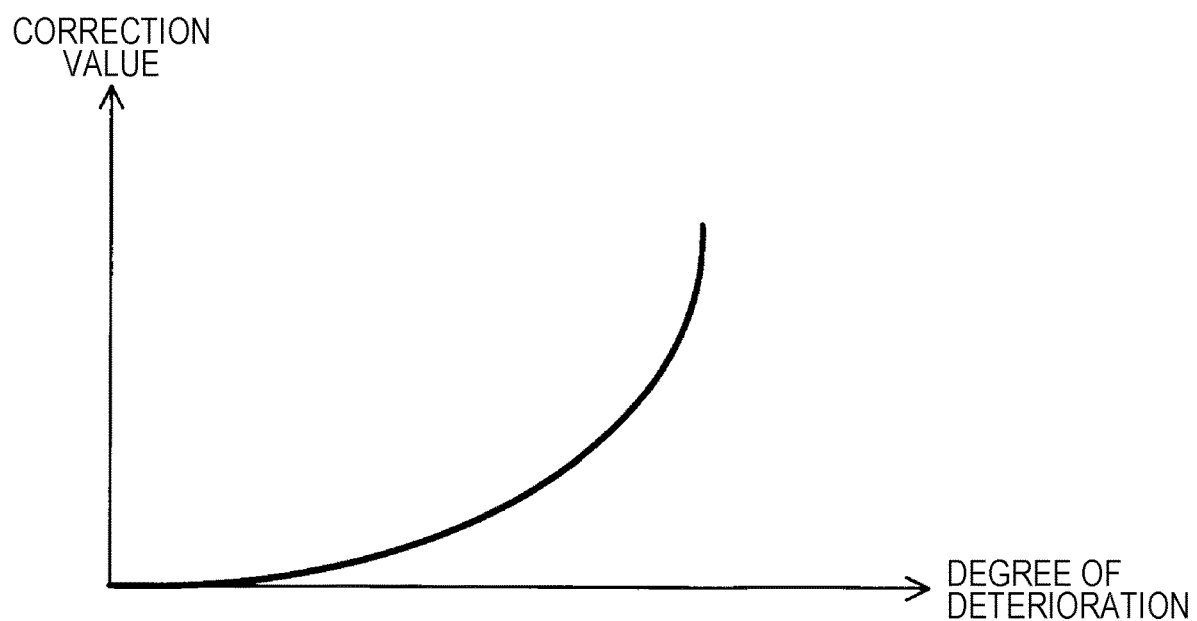
FIG. 10 is a diagram showing a function corresponding to the second table.

FIG. 10 is a diagram showing a function corresponding to the second table TBL2. The second calculation portion 253a may generate the second input information D2b by using a function representing a graph as shown in FIG. 10 instead of the second table TBL2. In addition to that, when a table for determining the degree of deterioration in detail (in FIG. 8, the degree of deterioration is defined in 1 unit, but for example, in more detail, it is defined in 0.1 unit) is used instead of the first table TBL1, there is an advantage that the optimum second input information D2b can be generated.

FIG. 11 is a diagram showing another example of the correspondence information D4. The calculation portion 353 may generate the correction information D5 or the second input information D2b by using the table TBL3 shown in FIG. 11 as the correspondence information D4. In this case, the correspondence information D4 includes the table TBL3 shown in FIG. 11. In this case, the second table TBL2 shown in FIG. 9 may be omitted.

The table TBL3 shown in FIG. 11 shows a correspondence relationship between the combination of the number of times that the drive element 111f is driven and the potential of the drive pulse PD and the correction value of the waveform of the drive pulse PD. The table TBL3 is obtained by integrating the first table TBL1 and the second table TBL2 described above.

1-7. Summary of First Embodiment

As described above, the liquid ejecting system 10 includes the head unit 110, the first connection portion 231, the decision portion 254, and the first input portion 253.

Here, the head unit 110 includes the nozzle N that ejects ink, which is an example of "liquid", the pressure chamber C communicating with the nozzle N, and the drive element 111f that gives a pressure fluctuation to the ink in the pressure chamber C by supplying the drive pulse PD. The first connection portion 231 is communicably connected with the server 300 through a network. The decision portion 254 decides the waveform of the drive pulse PD supplied to the drive element 111f based on the first input information D2a. The first input information D2a is input to the first input portion 253 from the server 300 through the first connection portion 231.

In the liquid ejecting system 10, the decision portion 254 decides the waveform of the drive pulse PD based on the input information D2, and thus it is possible to correct the waveform of the drive pulse PD so as to reduce the deterioration of the print quality due to the deterioration of the drive element 111f over time. Therefore, it is possible to reduce the deterioration of the print quality due to the deterioration of the drive element 111f over time while the burden on the manufacturer or the user of the printer main body is reduced. Here, since the input information D2 is input to the first input portion 253 through the first connection portion 231, the input information D2 generated by the server 300 can be used to decide the waveform by the decision portion 254. Even when the manufacturer of the printer main body is different from the manufacturer of the head, when the server 300 is prepared by the manufacturer of the head, knowledge of the manufacturer of the head can be utilized for the generation of the input information D2. Therefore, the configuration in which the input information D2 is generated by the server 300 has an advantage that the input information D2 can be easily generated as compared with the configuration in which the input information D2 is generated by a device such as the printer equipped with the head unit 110.

As described above, the liquid ejecting system 10 includes the liquid ejecting apparatus 100, the first processing apparatus 200, and the server 300. Here, the liquid ejecting apparatus 100 includes the head unit 110. The first processing apparatus 200 is communicably connected to the liquid ejecting apparatus 100 and generates the recorded data DP used for the liquid ejecting apparatus 100. Therefore, printing based on the recorded data DP from the first processing apparatus 200 can be performed by the liquid ejecting apparatus 100. Further, various information can be communicated between the liquid ejecting apparatus 100 and the first processing apparatus 200.

Each of the first input portion 253 and the first connection portion 231 is provided in the first processing apparatus 200 as described above. Therefore, the first input information D2a from the server 300 can be input to the first processing apparatus 200. Therefore, by providing the decision portion 254 in the first processing apparatus 200, the waveform information D3 regarding the waveform decided by the decision portion 254 or the information based on the waveform can be input from the first processing apparatus 200 to the liquid ejecting apparatus 100.

Further, the liquid ejecting system 10 has the first output portion 252 as described above. The first output portion 252 outputs the output information D1 regarding the degree of deterioration of the drive element 111f to the server 300 through the first connection portion 231. Therefore, the server 300 can generate the first input information D2a based on the output information D1. Here, for example, when the manufacturer of the head and the manufacturer of the printer main body are different, the manufacturer of the head not only provides the head unit 110, but also prepares the server 300 to which the user can connect. Then, the first output portion 252 outputs the output information D1 to the server 300 through the first connection portion 231. Therefore, the server 300 can generate the first input information Da utilizing the knowledge of the manufacturer of the head. As a result, the burden on manufacturer of the printer main body is reduced.

In the liquid ejecting system 10 including the first output portion 252, the first input portion 253 and the decision portion 254 may be omitted. Even in this case, the server 300 can generate the first input information D2a based on the output information D1. Therefore, the operator or the administrator of the server 300 can also provide various services to the user of the liquid ejecting apparatus 100 by various units by using the first input information D2a. The service includes a service of notifying the user of the degree of deterioration of the drive element 111f and reducing the deterioration of print quality due to the deterioration of the drive element 111f.

As described above, the server 300 includes the second calculation portion 353a. The second calculation portion 353a performs the calculation for generating the correction information D5 for correcting the reference waveform. The first input information D2a is the correction information D5. Then, the decision portion 254 decides the waveform of the drive pulse PD supplied to the drive element 111f by correcting the reference waveform using the correction information D5. Here, the reference waveform includes the first period T1, the second period T2, and the third period T3. The first period T1 is a period in which the absolute value of the potential becomes the first potential E2. The second period T2 is a period in which the absolute value of the potential becomes the second potential E3, which is larger than the first potential E2. The third period T3 is a period between the first period T1 and the second period T2, in which the absolute value of the potential increases from the first potential E2 to the second potential E3.

As described above, the second calculation portion 353a preferably corrects one or both of the second potential E3 and the second period T2 depending on the degree of deterioration indicated by the output information D1. When the second potential E3 is corrected, the second calculation portion 353a increases the correction amount for increasing the second potential E3 as the degree of deterioration of the drive element 111f increases. Therefore, when the degree of deterioration indicated by the output information D1 is the first degree, the second calculation portion 353a make a correction with the first correction amount to increase the second potential E3. Further, when the degree of deterioration indicated by the output information D1 is the second degree which indicates further deterioration than the first degree, the second calculation portion 353a makes a correction with the second correction amount than the first correction amount to increase the second potential E3.

As described above, as the degree of deterioration of the drive element 111f increases, the voltage ΔE of the drive pulse PD can be increased. As a result, it is possible to reduce the deterioration of the print quality due to the deterioration of the drive element 111f over time.

Further, when the second period T2 is corrected, the second calculation portion 353a increases the correction amount for shortening the second period T2 as the degree of deterioration of the drive element 111f increases. Therefore, when the degree of deterioration indicated by the output information D1 is the first degree, the second calculation portion 353a make a correction with the third correction amount to shorten the second period T2. Further, when the degree of deterioration indicated by the output information D1 is the second degree which indicates further deterioration than the first degree, the second calculation portion 353a makes a correction with the fourth correction amount than the third correction amount to shorten the second period T2.

As described above, as the degree of deterioration of the drive element 111f increases, the second period T2 can be shortened. As a result, it is possible to reduce the deterioration of the print quality due to the deterioration of the drive element 111f over time.

The server 300 includes the third calculation portion 353b. The third calculation portion 353b performs the calculation for determining the degree of deterioration of the drive element 111f based on the output information D1. The output information D1 includes the first output information D1a as described above. The first output information D1a is information regarding the number of times that the drive element 111f is driven. Here, when the number of times indicated by the first output information D1a is the first number of times, the third calculation portion 353b determines that the degree of deterioration of the drive element 111f is the third degree. Further, when the number of times indicated by the first output information D1a is the second number of times higher than the first number of times, the third calculation portion 353b determines that the degree of deterioration of the drive element 111f is the fourth degree that indicates further deterioration than the third degree. In this way, decision as to the degree of deterioration of the drive element 111f can be made.

As described above, the third calculation portion 353b determines that the greater the number of times indicated by the first output information D1a, the greater the degree of deterioration of the drive element 111f. The second input information D2b and the like can be generated by using such a determination result.

Further, the output information D1 includes the second output information D1b as described above. The second output information D1b is information regarding the amount corresponding to the amount of deterioration of the drive element 111f of per drive. Here, when the amount indicated by the second output information D1b is the first amount, the third calculation portion 353b determines that the degree of deterioration of the drive element 111f is the fifth degree. Further, when the amount indicated by the second output information D1b is the second amount that is greater than the first amount, the third calculation portion 353b determines that the degree of deterioration of the drive element 111f is the sixth degree that indicates further deterioration than the fifth degree.

As described above, the third calculation portion 353b determines that the greater the amount indicated by the second output information D1b, the greater the degree of deterioration of the drive element 111f. The second input information D2b and the like can be generated by using such a determination result.

Further, the output information D1 includes the head information D1c regarding the type of the head unit 110 as described above. Therefore, the server 300 can generate the first input information D2a according to the type of the head unit 110.

As described above, the server 300 includes the second connection portion 331, the second input portion 352, the storage circuit 340 which is an example of the "storage portion", the calculation portion 353 which is an example of a "fourth calculation portion", and the second output portion 351. The second connection portion 331 is communicably connected to the first connection portion 231. The output information D1 is input to the second input portion 352 through the second connection portion 331. The storage circuit 340 stores the correspondence information D4 regarding the correspondence relationship between the degree of deterioration of the drive element 111f and the waveform of the drive pulse PD. The calculation portion 353 performs the calculation for generating the first input information D2a based on the output information D1 and the correspondence information D4. The second output portion 351 outputs the first input information D2a through the second connection portion 331.

In the configuration in which the first input information D2a is generated by using the correspondence information D4 as described above, the calculation in the calculation portion 353 can be simplified as compared with the case where the first input information D2a is generated by using the calculation such as simulation.

Further, the liquid ejecting system 10 includes the third processing apparatus 400 as described above. The third processing apparatus 400 is communicably connected to the server 300. Then, the third processing apparatus 400 includes the update portion 410 that updates the correspondence information D4. Therefore, it is possible to optimize the correspondence information D4 for the situation.

Further, the server 300 is a cloud server as described above. Therefore, the installation cost can be reduced and the convenience can be improved as compared with the configuration using the on-premises server.

Further, the liquid ejecting system 10 includes the notification portion 255 as described above. The notification portion 255 notifies the user of the deterioration determination result of the drive element 111$f$ based on the second input information D2$b$ for notifying the user of the deterioration determination result of the drive element 111$f$. The second input information D2$b$ is information for notifying the user of the determination result of deterioration of the drive element 111$f$. The second input information D2$b$ is input to the first input portion 253 through the first connection portion 231. Therefore, it is possible to notify the user of the liquid ejecting apparatus 100 of the degree of deterioration of the drive element 111$f$.

In the liquid ejecting system 10 including the notification portion 255, the user of the liquid ejecting apparatus 100 can be notified of the degree of deterioration of the drive element 111$f$ even when the decision portion 254 is omitted.

As described above, the first processing apparatus 200 includes the processing circuit 250 including one or a plurality of processors, and the processing circuit 250 functions as the first input portion 253 and the first output portion 252. Therefore, the liquid ejecting system 10 includes one or more processors that function as the first input portion 253 and the first output portion 252.

2. SECOND EMBODIMENT

Hereinafter, a second embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 12:
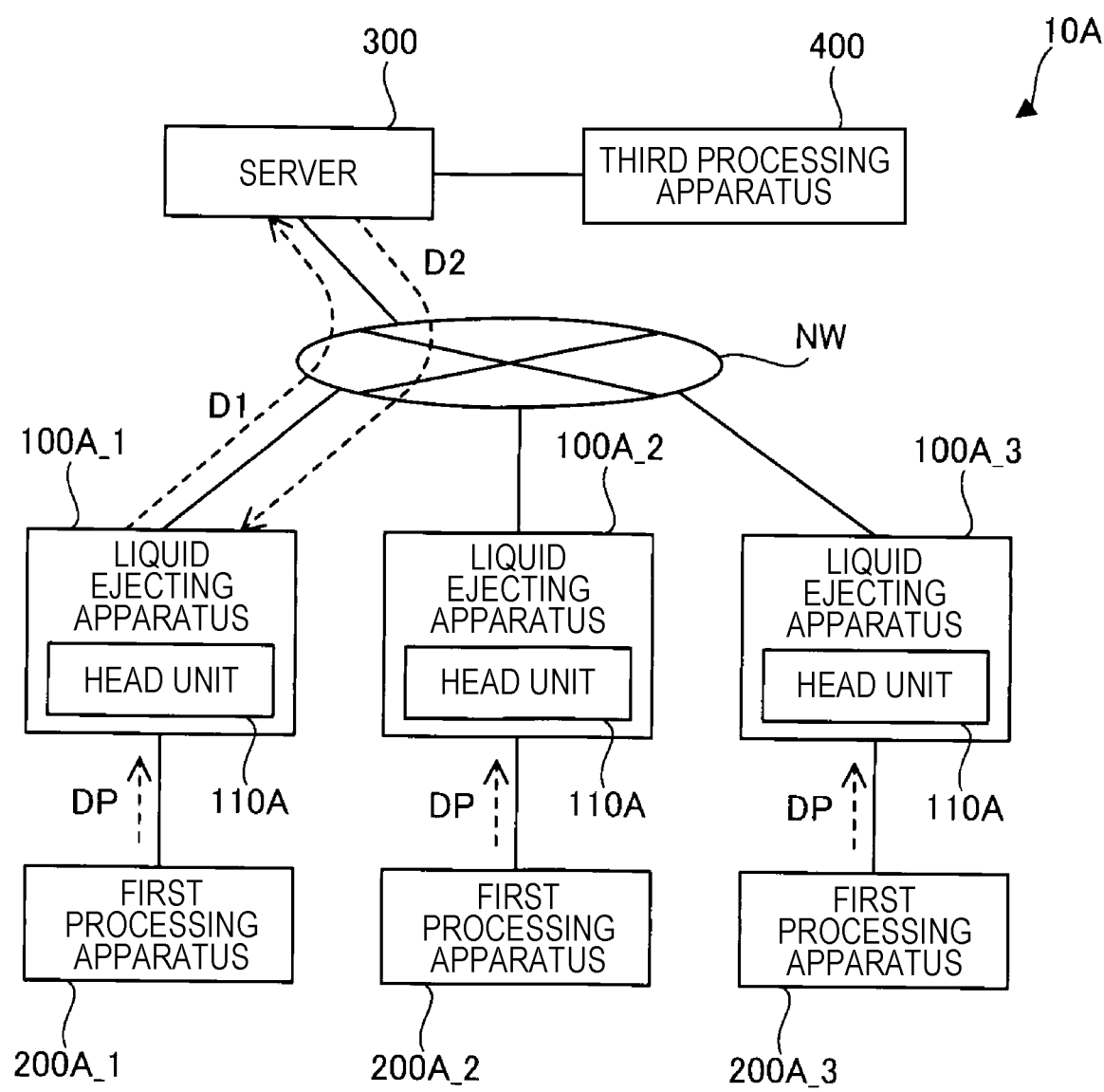
FIG. 12 is a schematic diagram showing a configuration example of a liquid ejecting system according to a second embodiment.

FIG. 12 is a schematic diagram showing a configuration example of a liquid ejecting system 10A according to the second embodiment. The liquid ejecting system 10A has the same configuration as that in the above-described first embodiment except that liquid ejecting apparatuses 100A_1 to 100A_3 and first processing apparatuses 200A_1 to 200A_3 are provided in place of the liquid ejecting apparatuses 100_1 to 100_3 and the first processing apparatuses 200_1 to 200_3.

The liquid ejecting apparatus 100A_1 is communicably connected to the first processing apparatus 200A_1 and is communicably connected to the server 300 through a communication network NW. The liquid ejecting apparatus 100A_2 is communicably connected to the first processing apparatus 200A_2 and is communicably connected to the server 300 through the communication network NW. The liquid ejecting apparatus 100A_3 is communicably connected to the first processing apparatus 200A_3 and is communicably connected to the server 300 through the communication network NW. As described above, the liquid ejecting apparatuses 100A_1 to 100A_3 correspond to the first processing apparatuses 200A_1 to 200A_3, respectively, and are communicably connected to the first processing apparatuses 200A_1 to 200A_3, and communicably connected to the server 300 through the communication network NW. In the following, without distinguishing each of the liquid ejecting apparatuses 100A_1 to 100A_3, they may be referred to as the liquid ejecting apparatus 100A. Without distinguishing each of the first processing apparatuses 200A_1 to 200A_3, they may be referred to as the first processing apparatus 200A.

In the example shown in FIG. 12, the number of each of the liquid ejecting apparatus 100A and the first processing apparatus 200A included in the liquid ejecting system 10A is three, but the number is not limited thereto, and the number may be one, two, or four or more. That is, the number of the sets of the liquid ejecting apparatus 100A and the first processing apparatus 200A is not limited to three, and may be one, two, or four or more.

The liquid ejecting apparatus 100A is configured in the same manner as the liquid ejecting apparatus 100 of the first embodiment described above, except that a head unit 110A is provided in place of the head unit 110. The head unit 110 is the same as the head unit 110 except that a function of deciding the waveform of a drive pulse PD is added. Details of the liquid ejecting apparatus 100A will be described later with reference to FIG. 13.

The liquid ejecting apparatus 100A outputs output information D1 to the server 300 and inputs input information D2 from the server 300. Then, the liquid ejecting apparatus 100A decides the waveform of the drive pulse based on the input information D2.

The first processing apparatus 200A is configured in the same manner as the first processing apparatus 200 of the first embodiment described above, except that the function of deciding the waveform of the drive pulse PD is omitted.

Figure 13:
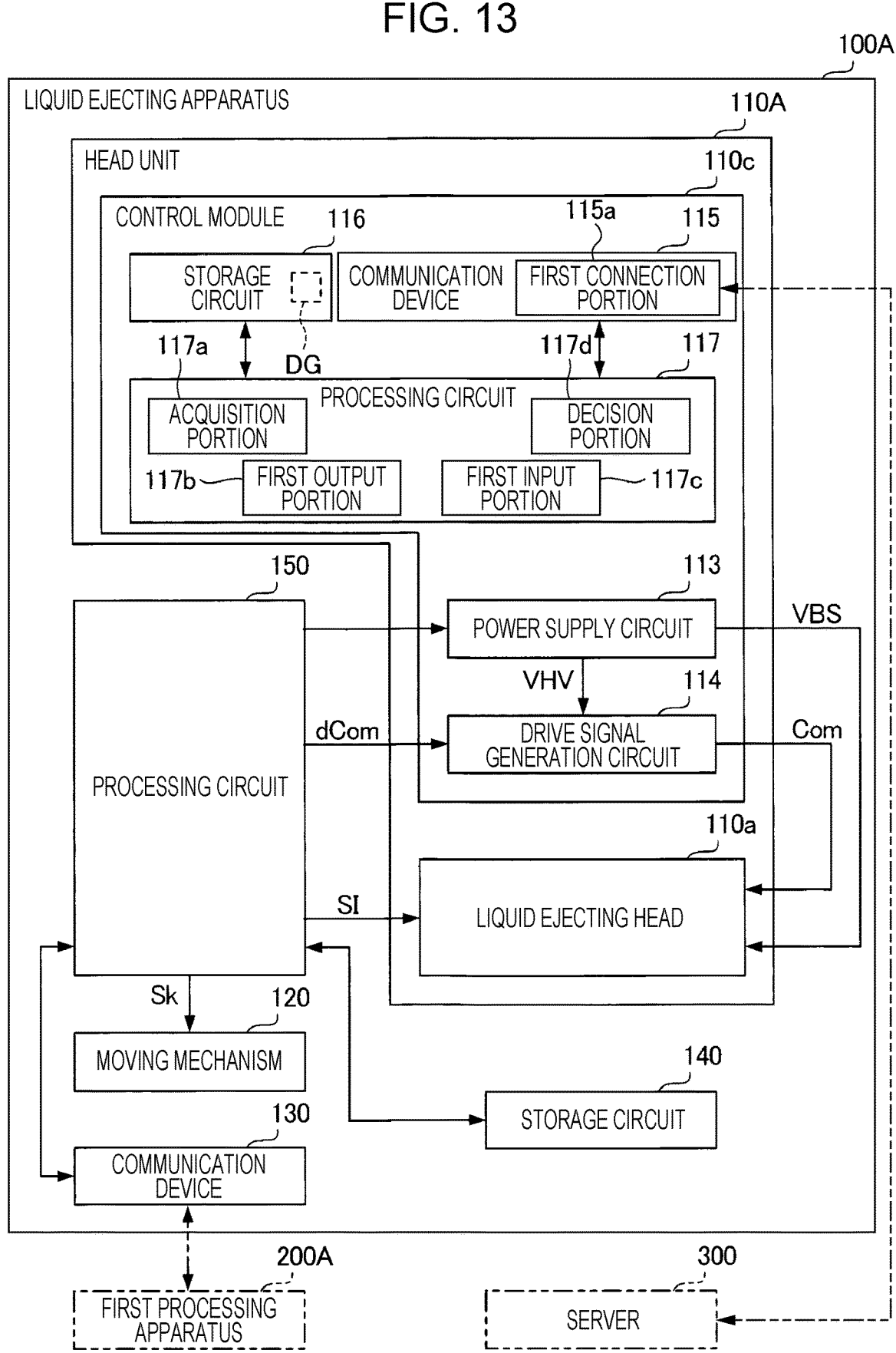
FIG. 13 is a schematic diagram showing a configuration example of a liquid ejecting apparatus used in the liquid ejecting system according to the second embodiment.

FIG. 13 is a schematic diagram showing a configuration example of a liquid ejecting apparatus 100A used in the liquid ejecting system 10A according to the second embodiment. As shown in FIG. 13, the head unit 110A included in the liquid ejecting apparatus 100A is configured in the same manner as the head unit 110 of the first embodiment except that a control module 110$c$ is provided in place of the control module 110$b$. The control module 110$c$ is configured in the same manner as the control module 110$b$ except that a communication device 115, a storage circuit 116, and a processing circuit 117 are added.

The communication device 115 is a circuit capable of communicating with the server 300. For example, the communication device 115 is an interface such as a wireless or wired LAN or USB. The communication device 115 transmits the output information D1 and receives the input information D2 by communicating with the server 300. That is, the communication device 115 functions as the first connection portion 115$a$ that is communicably connected to the server 300, as similar to the first connection portion 231 of the first embodiment.

The storage circuit 116 is a device that stores various programs executed by the processing circuit 117 and various data processed by the processing circuit 117. The storage circuit 116 includes, for example, a semiconductor memory.

The storage circuit 116 stores the same information DG as in FIG. 4 described above. That is, the program PG1, the output information D1, the input information D2, and the waveform information D3 are stored in the storage circuit 116.

The processing circuit 117 is a device having a function of controlling each portion of the control module 110$c$ and a function of processing various data. The processing circuit 117 has one or more processors such as, for example, a CPU. The processing circuit 117 may be integrally formed with the storage circuit 116, and may be constituted by hardware such as a DSP, an ASIC, a PLD, or an FPGA.

The processing circuit 117 functions as an acquisition portion 117$a$, a first output portion 117$b$, a first input portion 117c, and a decision portion 117d by reading the program PG1 from the storage circuit 116 and executing the program PG1.

The acquisition portion 117a acquires the output information D1, as similar to the acquisition portion 251 of the first embodiment. The first output portion 117b outputs the output information D1 through the first connection portion 115a, as similar to the first output portion 252 of the first embodiment. The input information D2 is input to the first input portion 117c through the first connection portion 115a, as similar to the first input portion 253 of the first embodiment. The decision portion 117d decides the waveform of the drive pulse PD based on the input information D2, as similar to the decision portion 254 of the first embodiment.

Figure 14:
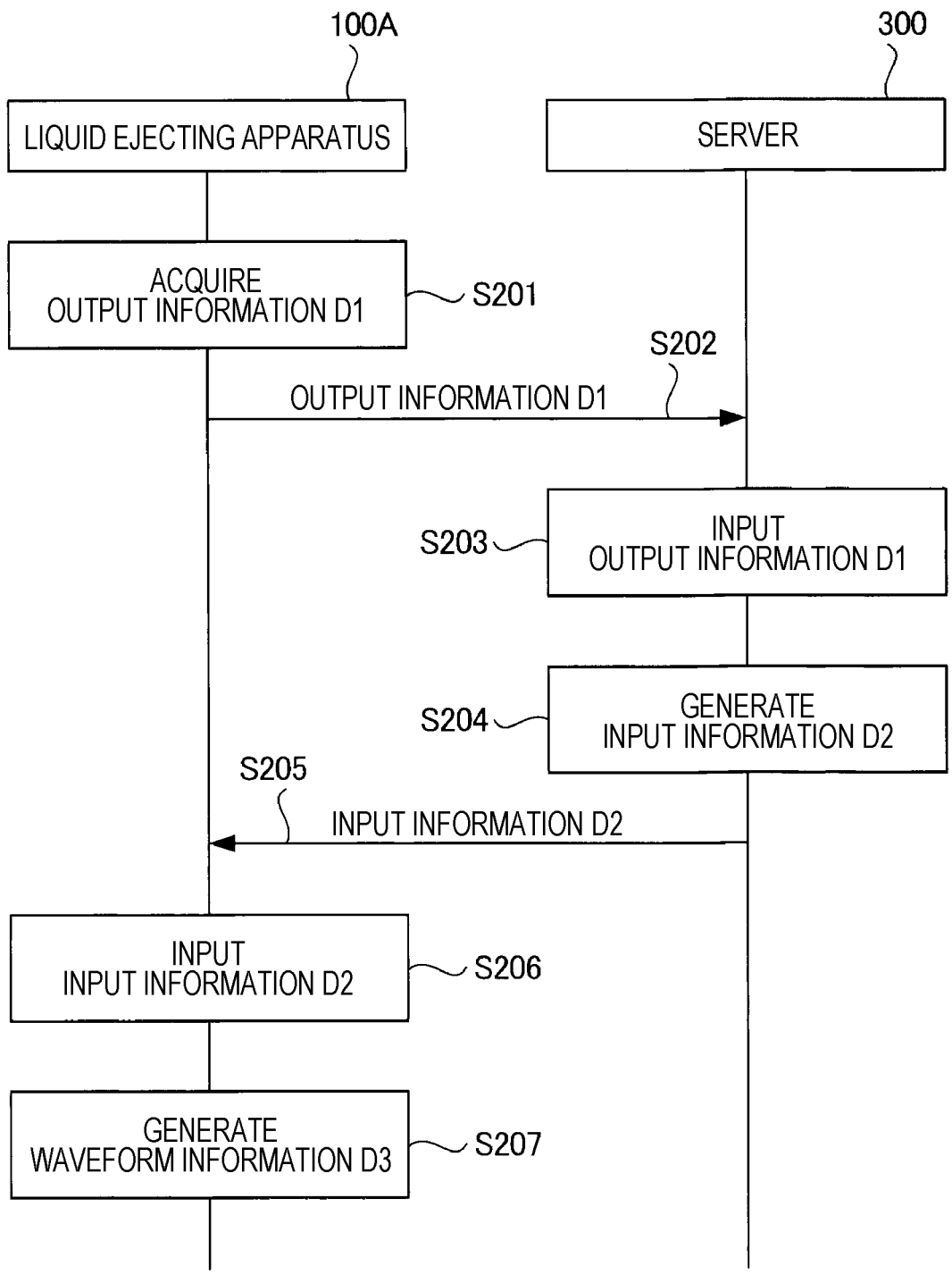
FIG. 14 is a flowchart showing a process of the liquid ejecting system according to the second embodiment.

FIG. 14 is a flowchart showing a process of the liquid ejecting system 10A according to the second embodiment. In the liquid ejecting system 10A, first, as shown in FIG. 14, in step S201, the liquid ejecting apparatus 100A acquires the output information D1. Then, in step S202, the liquid ejecting apparatus 100A outputs the output information D1 to the server 300.

Next, in step S203, the server 300 inputs the output information D1. Then, in step S204, the server 300 generates the input information D2 based on the output information D1. Then, in step S205, the server 300 outputs the input information D2 to the liquid ejecting apparatus 100A.

Next, in step S206, the liquid ejecting apparatus 100A inputs the input information D2. Then, in step S207, the liquid ejecting apparatus 100A generates the waveform information D3 based on the input information D2.

As similar to the first embodiment, in the above second embodiment, even when the manufacturer of the printer main body is different from the manufacturer of the head, it is possible to reduce the burden on the manufacturer or the user of the printer main body and reduce the deterioration of the print quality due to the deterioration of the drive element 111f over time. In the present embodiment, as described above, each of the first input portion 117c and the first connection portion 115a is provided in the liquid ejecting apparatus 100A. Therefore, it is possible to input the input information D2 from the server 300 to the liquid ejecting apparatus 100A. Therefore, by providing the decision portion 117d in the liquid ejecting apparatus 100A, it is possible to use the information regarding the waveform decided by the decision portion 117d in the liquid ejecting apparatus 100A. Further, since it is not necessary to incorporate the program for deciding the waveform of the drive pulse PD into the first processing apparatus 200A, it is also possible to reduce the burden on the manufacturer or the user of the printer main body in this respect.

3. THIRD EMBODIMENT

Hereinafter, a third embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 15:
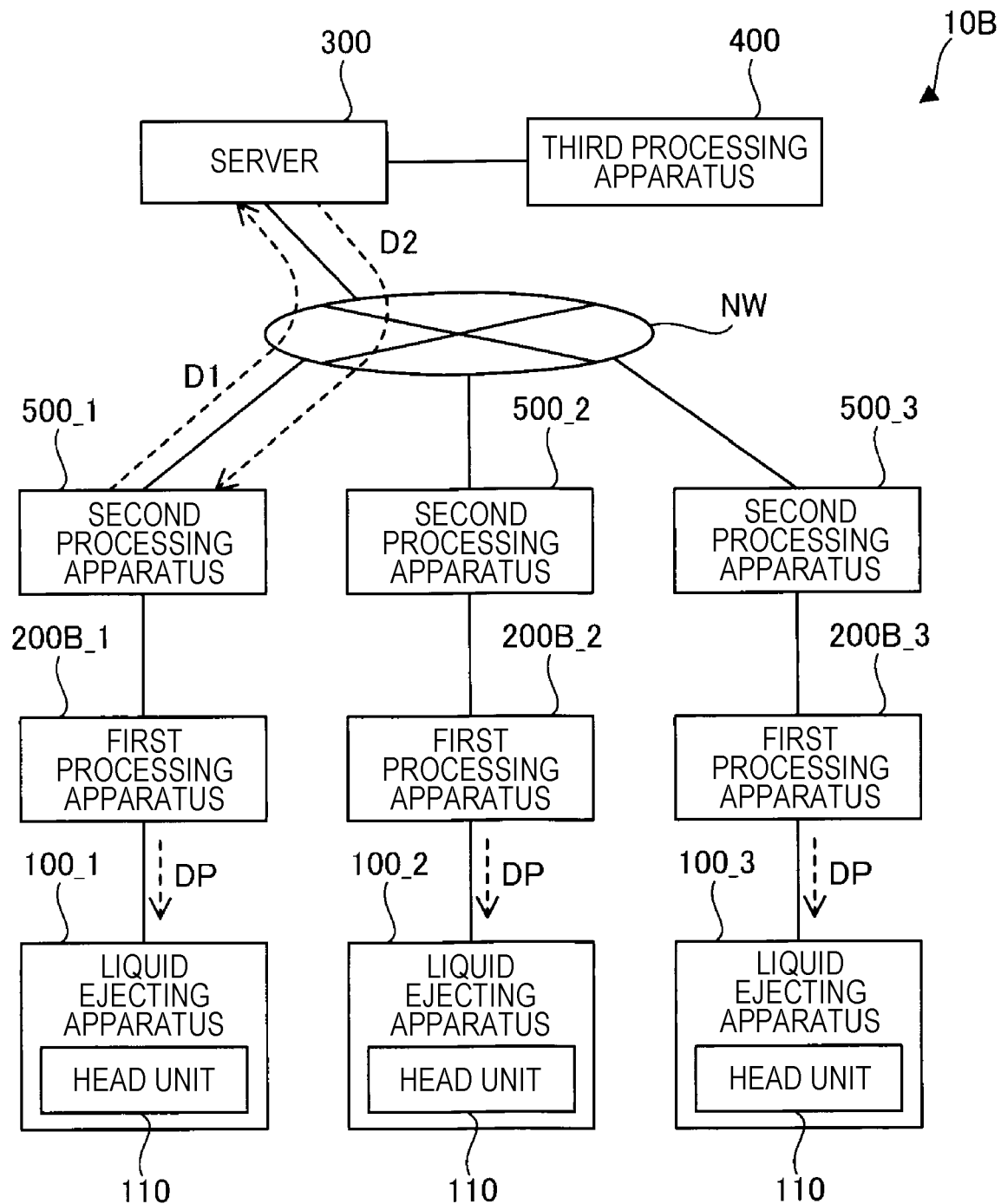
FIG. 15 is a schematic diagram showing a configuration example of a liquid ejecting system according to a third embodiment.

FIG. 15 is a schematic diagram showing a configuration example of a liquid ejecting system 10B according to the third embodiment. The liquid ejecting system 10B is configured in the same manner as that of the above-described first embodiment except that first processing apparatuses 200B_1 to 200B_3 are provided in place of the first processing apparatuses 200_1 to 200_3 and second processing apparatuses 500_1 to 500_3 are added.

The second processing apparatus 500_1 is communicably connected to the first processing apparatus 200B_1 and is communicably connected to the server 300 through the communication network NW. The second processing apparatus 500_2 is communicably connected to the first processing apparatus 200B_2 and is communicably connected to the server 300 through the communication network NW. The second processing apparatus 500_3 is communicably connected to the first processing apparatus 200B_3 and is communicably connected to the server 300 through the communication network NW. As described above, the second processing apparatuses 500_1 to 500_3 correspond to the first processing apparatuses 200B_1 to 200B_3, respectively, and are communicably connected to the first processing apparatuses 200B_1 to 200B_3 and are communicably connected to the server 300 through the communication network NW. In the following, without distinguishing each of the second processing apparatuses 500_1 to 500_3, they may be referred to as the second processing apparatus 500. Without distinguishing each of the first processing apparatuses 200B_1 to 200B_3, they may be referred to as the first processing apparatus 200B.

In the example shown in FIG. 15, the number of each of the second processing apparatus 500, the liquid ejecting apparatus 100, and the first processing apparatus 200B included in the liquid ejecting system 10B is three, but the number is not limited thereto, and the number may be one, two, or four or more. That is, the number of sets of the second processing apparatus 500, the liquid ejecting apparatus 100, and the first processing apparatus 200B is not limited to three, and may be one, two, or four or more.

The first processing apparatus 200B is configured in the same manner as the first processing apparatus 200 of the first embodiment, except that it is communicably connected to each of the second processing apparatus 500 and the liquid ejecting apparatus 100.

The second processing apparatus 500 is a mobile terminal such as a smartphone or a tablet terminal, and is configured to be able to communicate with each of the server 300 and the first processing apparatus 200B. The second processing apparatus 500 acquires the output information D1, outputs the output information D1 to the server 300, and inputs the input information D2 from the server 300.

The first processing apparatus 200B is configured in the same manner as the first processing apparatus 200 of the first embodiment. However, among the acquisition portion 251, the first output portion 252, the first input portion 253, and the decision portion 254, the first processing apparatus 200B does not use the first output portion 252 and the first input portion 253, and uses the acquisition portion 251 and the decision portion 254. Therefore, in the first processing apparatus 200B, one or both of the first output portion 252 and the first input portion 253 may be omitted.

Figure 16:
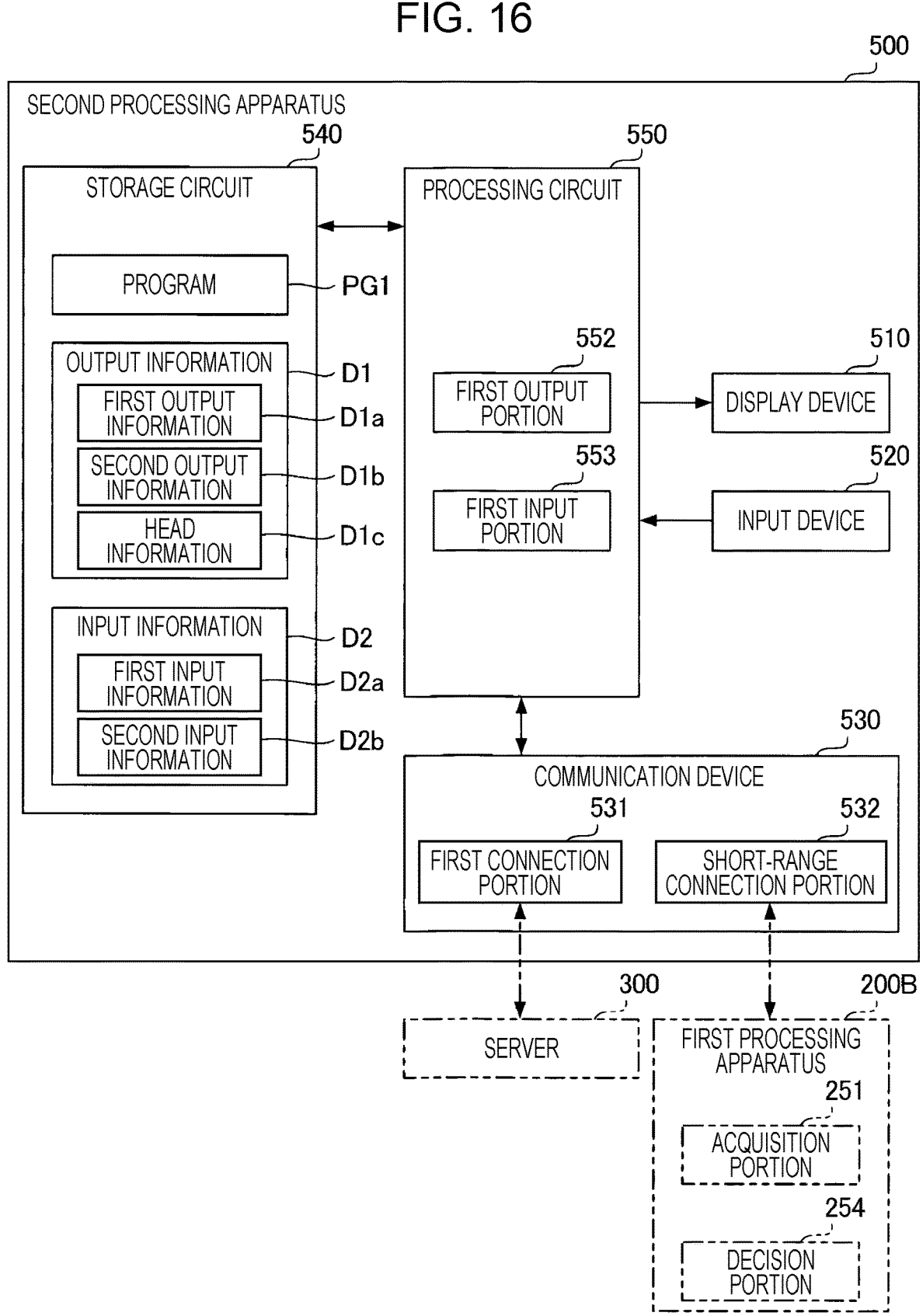
FIG. 16 is a schematic diagram showing a configuration example of a second processing apparatus used in the liquid ejecting system according to the third embodiment.

FIG. 16 is a schematic diagram showing a configuration example of the second processing apparatus 500 used in the liquid ejecting system 10B according to the third embodiment. The second processing apparatus 500 includes a display device 510, an input device 520, a communication device 530, a storage circuit 540, and a processing circuit 550. The components are communicably connected to each other.

The display device 510 displays various images under the control of the processing circuit 550. Here, the display device 510 includes various display panels such as a liquid crystal display panel or an organic electro-luminescence (EL) display panel, for example.

The input device 520 is a device that receives operations from the user. For example, the input device 520 has a pointing device such as a touch panel. Here, when the input device 520 has a touch panel, the input device 520 is integrally formed with the display device 510.

The communication device 530 is a circuit capable of communicating with each of the first processing apparatus 200B and the server 300. The communication device 530 is an interface for short-range wireless communication such as near field communication (NFC), Bluetooth low energy (BLE), Wi-Fi or Bluetooth, wireless or wired LAN, and USB. NFC, BLE, Wi-Fi and Bluetooth are registered trademarks.

The communication device 530 transmits the output information D1 and receives the input information D2 by communicating with the server 300. That is, the communication device 530 functions as a first connection portion 531 that is communicably connected to the server 300. Further, the communication device 530 functions as a short-range connection portion 532 that is communicably connected to the first processing apparatus 200B by short-range wireless communication, and transmits the waveform information D3 to the first processing apparatus 200B by the function. The communication device 530 may be integrated with the processing circuit 550.

The storage circuit 540 is a device that stores various programs executed by the processing circuit 550 and various data processed by the processing circuit 550. The storage circuit 540 includes, for example, a semiconductor memory.

The program PG1, the output information D1, the input information D2, and the waveform information D3 are stored in the storage circuit 540 of the present embodiment.

The processing circuit 550 is a device having a function of controlling each portion of the second processing apparatus 500 and a function of processing various data. The processing circuit 550 has one or more processors such as, for example, a CPU. Some or all of the functions of the processing circuit 550 may be implemented by hardware such as DSP, ASIC, PLD, and FPGA.

The processing circuit 550 functions as a first output portion 552 and a first input portion 553 by reading the program PG1 from the storage circuit 540 and executing the program PG1. In the present embodiment, the program PG1 stored in the storage circuit 540 does not implement the functions corresponding to the acquisition portion 251 and the decision portion 254 of the first embodiment in the processing circuit 550, but may implement the function corresponding to one or both of the acquisition portion 251 and the decision portion 254 in the processing circuit 550. When the function corresponding to the decision portion 254 is implemented in the processing circuit 550, the waveform of the drive pulse PD may be decided by the second processing apparatus 500 instead of the first processing apparatus 200B. When the function corresponding to the acquisition portion 251 is implemented in the processing circuit 550, the output information D1 may be acquired by the second processing apparatus 500, instead of the first processing apparatus 200B.

The first output portion 552 outputs the output information D1 through the first connection portion 531. For example, the first output portion 552 outputs the output information D1 to the server 300 through the first connection portion 531 by using an instruction or the like issued by a user using the input device 520 as a trigger.

The input information D2 is input to the first input portion 553 through the first connection portion 531. For example, the input information D2 is input from the server 300 to the first input portion 553 through the first connection portion 531, by using an instruction or the like issued by the user using the input device 520 as a trigger.

Figure 17:
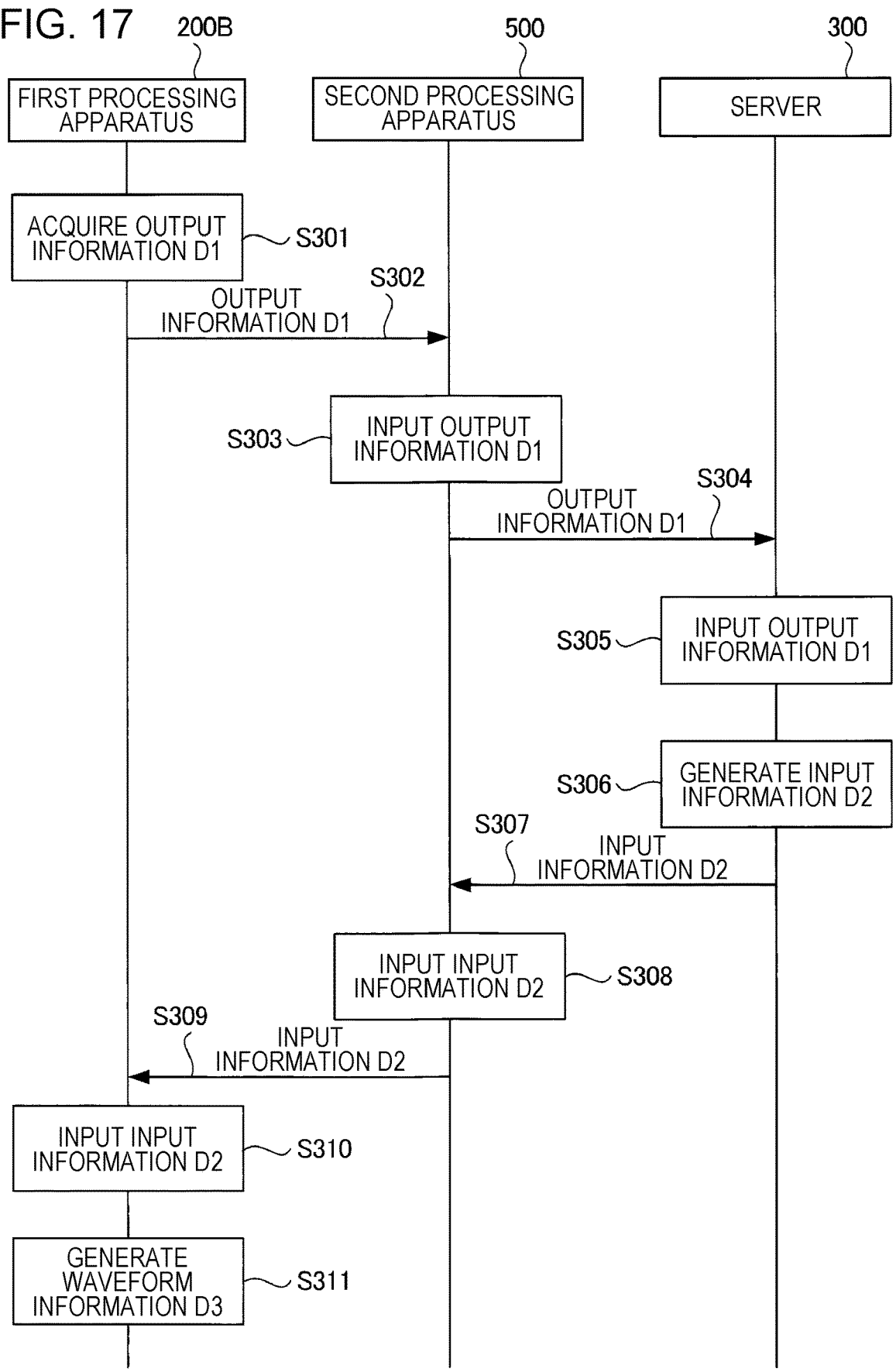
FIG. 17 is a flowchart showing a process of the liquid ejecting system according to the third embodiment.

FIG. 17 is a flowchart showing a process of the liquid ejecting system 10B according to the third embodiment. In the liquid ejecting system 10B, first, as shown in FIG. 17, in step S301, the first processing apparatus 200B acquires the output information D1. Then, in step S302, the first processing apparatus 200B outputs the output information D1 to the second processing apparatus 500.

Next, in step S303, the second processing apparatus 500 inputs the output information D1. Then, in step S304, the second processing apparatus 500 outputs the output information D1 to the server 300.

Next, in step S305, the server 300 inputs the output information D1. Then, in step S306, the server 300 generates the input information D2 based on the output information D1. Then, in step S307, the server 300 outputs the input information D2 to the second processing apparatus 500.

Next, in step S308, the second processing apparatus 500 inputs the input information D2. Then, in step S309, the second processing apparatus 500 outputs the input information D2 to the first processing apparatus 200B.

Next, in step S310, the first processing apparatus 200B inputs the input information D2. Then, in step S311, the first processing apparatus 200B generates the waveform information D3 based on the input information D2.

As similar to the first embodiment and the second embodiment, in the above third embodiment, even when the manufacturer of the printer main body is different from the manufacturer of the head, it is possible to reduce the burden on the manufacturer or the user of the printer main body and reduce the deterioration of the print quality due to the deterioration of the drive element 111$f$ over time. In the present embodiment, as described above, the liquid ejecting system 10B includes the second processing apparatus 500. The second processing apparatus 500 is communicably connected to the first processing apparatus 200. The first input portion 553 and the first connection portion 531 are provided in the second processing apparatus 500. Therefore, the input information D2 from the server 300 can be input to the second processing apparatus 500. Further, the decision portion 254 can be provided in the first processing apparatus 200B. Then, the information regarding the waveform decided by the decision portion 254 can be input from the first processing apparatus 200B to the liquid ejecting apparatus 100. The second processing apparatus 500 may be provided with a functional portion corresponding to the decision portion 254, and in this case, information regarding the waveform decided by the functional portion can be input from the second processing apparatus 500 to the liquid ejecting apparatus 100 through the first processing apparatus 200.

Further, as described above, the first processing apparatus 200 and the second processing apparatus 500 are communicably connected to each other by short-range wireless communication. Therefore, in a simple communication environment, the input information D2 can be input from the second processing apparatus 500 to the first processing apparatus 200B. When the second processing apparatus 500 is provided with the functional portion corresponding to the decision portion 254, the information regarding the waveform decided by the functional portion can also be input from the second processing apparatus 500 to the first processing apparatus 200B.

4. FOURTH EMBODIMENT

Hereinafter, a fourth embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 18:
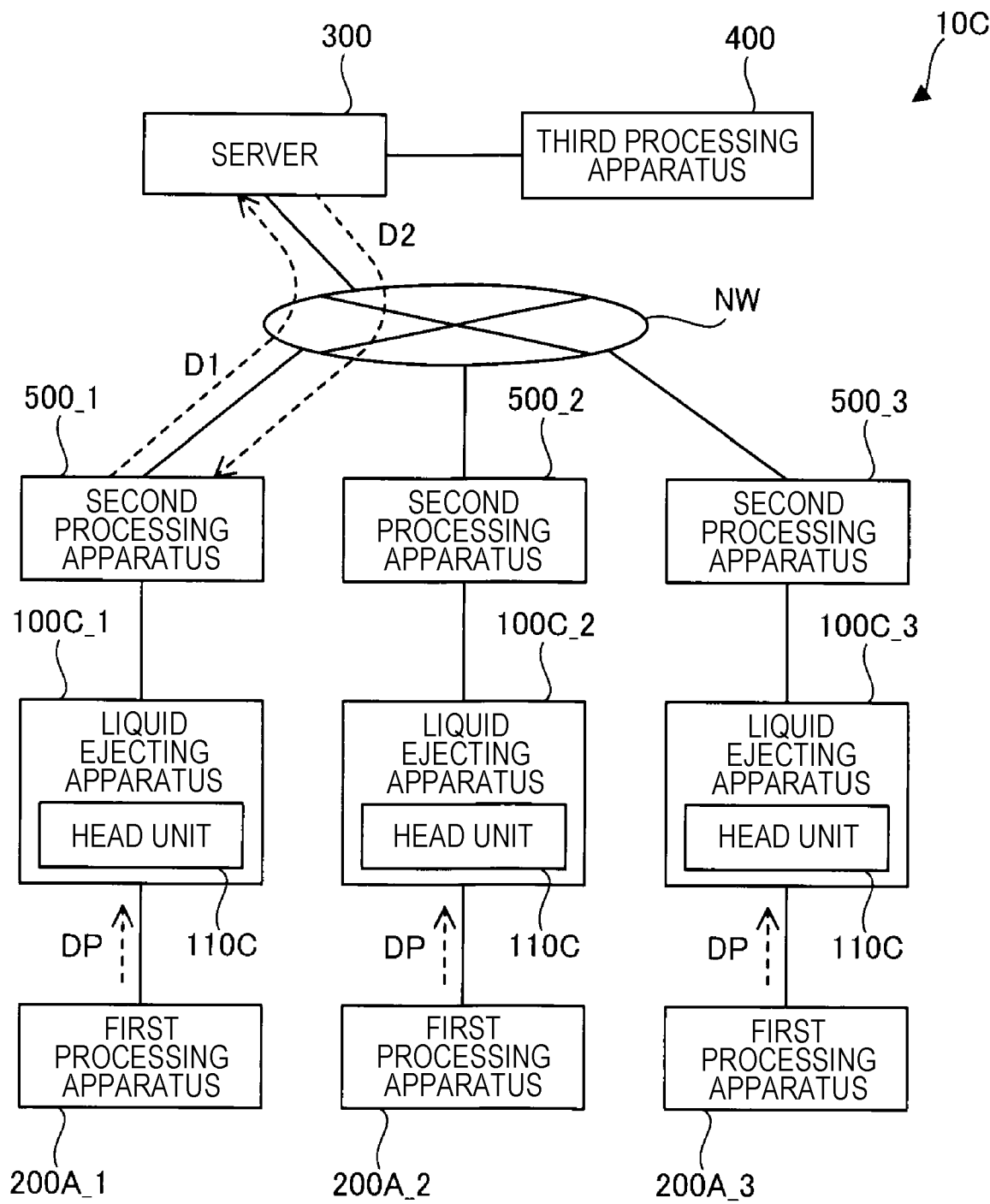
FIG. 18 is a schematic diagram showing a configuration example of a liquid ejecting system according to a fourth embodiment.

FIG. 18 is a schematic diagram showing a configuration example of a liquid ejecting system 10C according to the fourth embodiment. The liquid ejecting system 10C is configured in the same manner as that of the first embodiment described above except that liquid ejecting apparatuses 100C_1 to 100C_3 and first processing apparatuses 200A_1 to 200A_3 are provided in place of the liquid ejecting apparatuses 100_1 to 100_3 and the first processing apparatuses 200_1 to 200_3, and second processing apparatuses 500_1 to 500_3 are added. That is, the liquid ejecting system 10C has the same configuration as that in the above-described third embodiment except that liquid ejecting apparatuses 100C_1 to 100C_3 and first processing apparatuses 200A_1 to 200A_3 are provided in place of the liquid ejecting apparatuses 100_1 to 100_3 and the first processing apparatuses 200B_1 to 200B_3. The first processing apparatus 200A is configured in the same manner as the first processing apparatus 200A of the second embodiment.

In the present embodiment, the second processing apparatus 500_1 is communicably connected to the liquid ejecting apparatus 100C_1 and is communicably connected to the server 300 through the communication network NW. The second processing apparatus 500_2 is communicably connected to the liquid ejecting apparatus 100C_2 and is communicably connected to the server 300 through the communication network NW. The second processing apparatus 500_3 is communicably connected to the liquid ejecting apparatus 100C_3 and is communicably connected to the server 300 through the communication network NW. As described above, the second processing apparatuses 500_1 to 500_3 correspond to the liquid ejecting apparatuses 100C_1 to 100C_3, respectively, and are communicably connected to the liquid ejecting apparatuses 100C_1 to 100C_3 and communicably connected to the server 300 through the communication network NW. In the following, without distinguishing each of the liquid ejecting apparatuses 100C_1 to 100C_3, they may be referred to as the liquid ejecting apparatus 100C.

In the example shown in FIG. 18, the number of each of the second processing apparatus 500, the liquid ejecting apparatus 100C, and the first processing apparatus 200A included in the liquid ejecting system 10C is three, but the number is not limited thereto, and the number may be one, two, or four or more. That is, the number of sets of the second processing apparatus 500, the liquid ejecting apparatus 100C, and the first processing apparatus 200A is not limited to three, and may be one, two, or four or more.

The liquid ejecting apparatus 100C is configured in the same manner as the liquid ejecting apparatus 100A of the second embodiment except that it can communicate with each of the server 300 and the first processing apparatus 200A.

Figure 19:
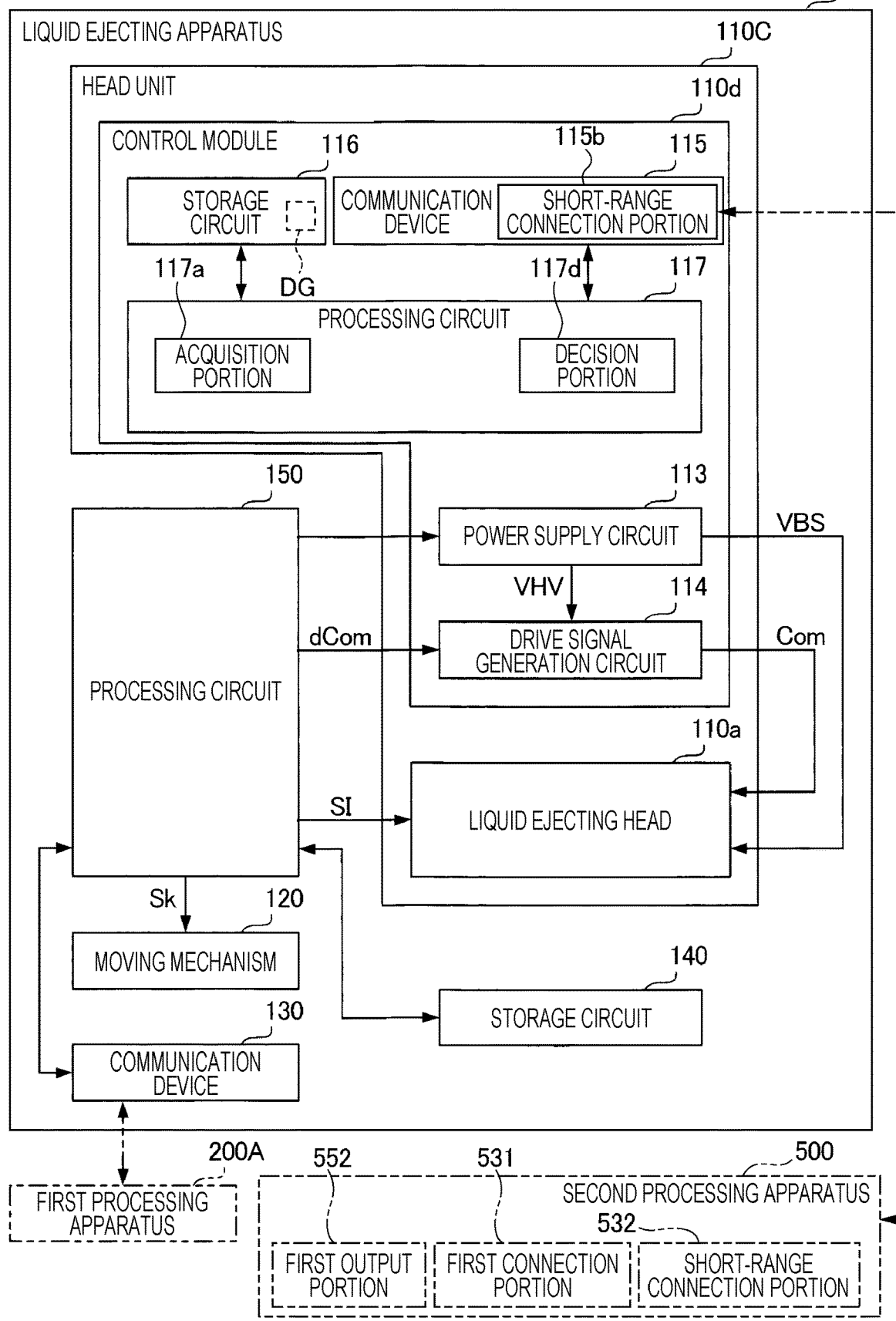
FIG. 19 is a schematic diagram showing a configuration example of a liquid ejecting apparatus used in the liquid ejecting system according to the fourth embodiment.

FIG. 19 is a schematic diagram showing a configuration example of the liquid ejecting apparatus 100C used in the liquid ejecting system 10C according to the fourth embodiment. As shown in FIG. 19, the liquid ejecting apparatus 100C is configured in the same manner as the liquid ejecting apparatus 100A of the second embodiment except that a head unit 110C is provided in place of the head unit 110A. The head unit 110C is configured in the same manner as the head unit 110A except that a control module 110d is provided in place of the control module 110c. The control module 110d is the same as the control module 110c except that the communication device 115 functions as a short-range connection portion 115b and the processing circuit 117 functions as the acquisition portion 117a and the decision portion 117d.

In the present embodiment, the communication device 115 is a circuit capable of communicating with the second processing apparatus 500. For example, the communication device 115 is an interface for short-range wireless communication such as Wi-Fi or Bluetooth. That is, the communication device 115 functions as the short-range connection portion 115b that is communicably connected to the short-range connection portion 532 of the second processing apparatus 500 by short-range wireless communication, and outputs the output information D1 to the second processing apparatus 500 or inputs the input information D2 from the second processing apparatus 500 by the function.

Figure 20:
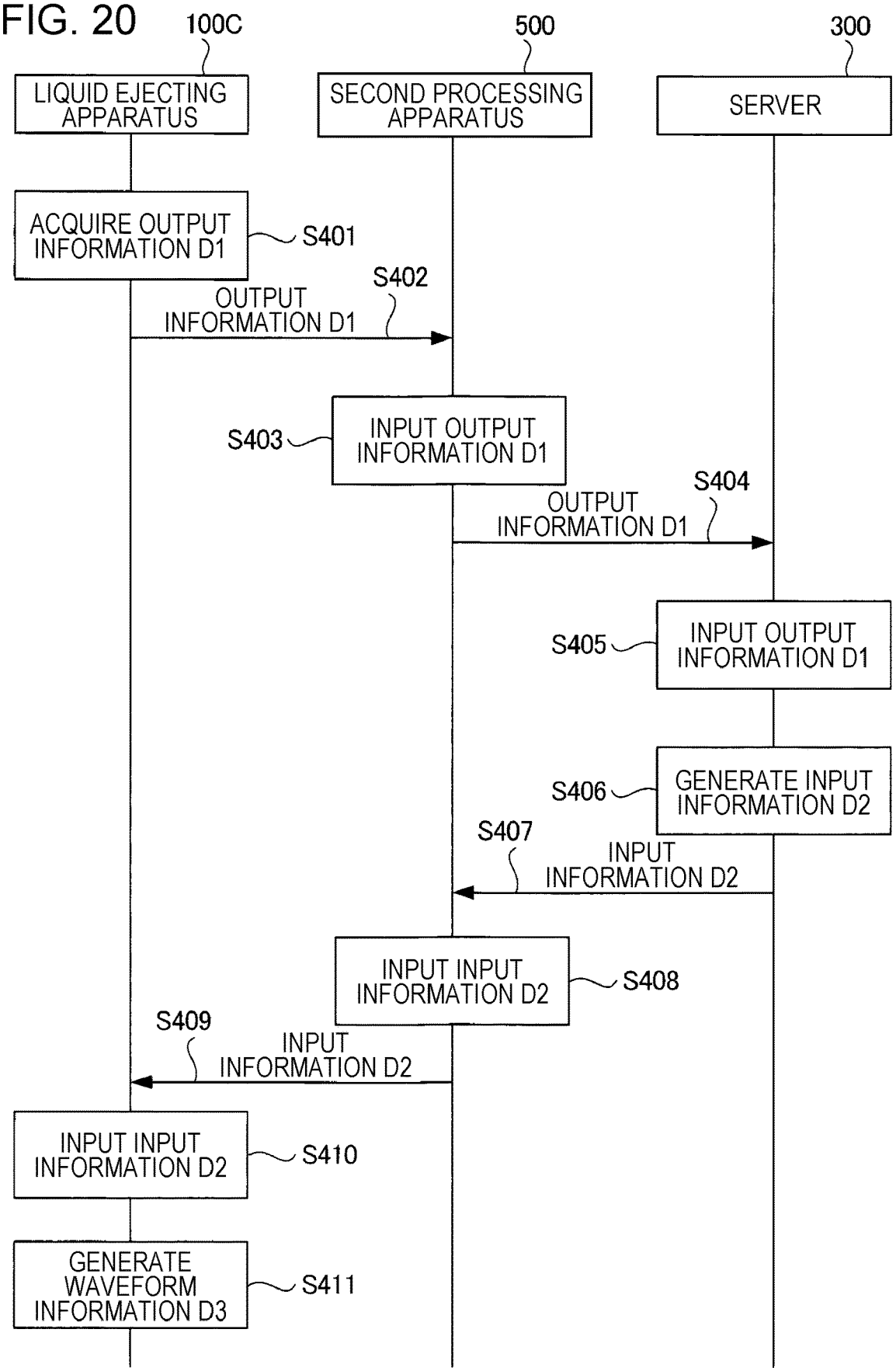
FIG. 20 is a flowchart showing a process of the liquid ejecting system according to the fourth embodiment.

FIG. 20 is a flowchart showing a process of the liquid ejecting system 10C according to the fourth embodiment. In the liquid ejecting system 10C, first, as shown in FIG. 20, in step S401, the liquid ejecting apparatus 100C acquires the output information D1. Then, in step S402, the liquid ejecting apparatus 100C outputs the output information D1 to the second processing apparatus 500.

Next, in step S403, the second processing apparatus 500 inputs the output information D1. Then, in step S404, the second processing apparatus 500 outputs the output information D1 to the server 300.

Next, in step S405, the server 300 inputs the output information D1. Then, in step S406, the server 300 generates the input information D2 based on the output information D1. Then, in step S407, the server 300 outputs the input information D2 to the second processing apparatus 500.

Next, in step S408, the second processing apparatus 500 inputs the input information D2. Then, in step S409, the second processing apparatus 500 outputs the input information D2 to the liquid ejecting apparatus 100C.

Next, in step S410, the liquid ejecting apparatus 100C inputs the input information D2. Then, in step S411, the liquid ejecting apparatus 100C generates the waveform information D3 based on the input information D2.

As similar to the first embodiment to the third embodiment, in the above fourth embodiment, even when the manufacturer of the printer main body is different from the manufacturer of the head, it is possible to reduce the burden on the manufacturer or the user of the printer main body and reduce the deterioration of the print quality due to the deterioration of the drive element 111f over time. In the present embodiment, as described above, the liquid ejecting system 10C includes the second processing apparatus 500. The second processing apparatus 500 is communicably connected to the liquid ejecting apparatus 100. The first input portion 553 and the first connection portion 531 are provided in the second processing apparatus 500. Therefore, the input information D2 from the server 300 can be input to the second processing apparatus 500. Further, the liquid ejecting apparatus 100C can be provided with the decision portion 117d. Then, the information regarding the waveform decided by the decision portion 117d can be used in the liquid ejecting apparatus 100. The second processing apparatus 500 may be provided with a functional portion corresponding to the decision portion 117d, and in this case, information regarding the waveform decided by the functional portion can be input from the second processing apparatus 500 to the liquid ejecting apparatus 100.

Further, as described above, the liquid ejecting apparatus 100 and the second processing apparatus 500 are communicably connected to each other by short-range wireless communication. Therefore, in a simple communication environment, the output information D1 can be output from the liquid ejecting apparatus 100C to the second processing apparatus 500, or the input information D2 from the second processing apparatus 500 can be input to the liquid ejecting apparatus 100C. When the second processing apparatus 500 is provided with the functional portion corresponding to the decision portion 254, the information regarding the waveform decided by the functional portion can also be input from the second processing apparatus 500 to the liquid ejecting apparatus 100C.

5. FIFTH EMBODIMENT

Hereinafter, a fifth embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 21:
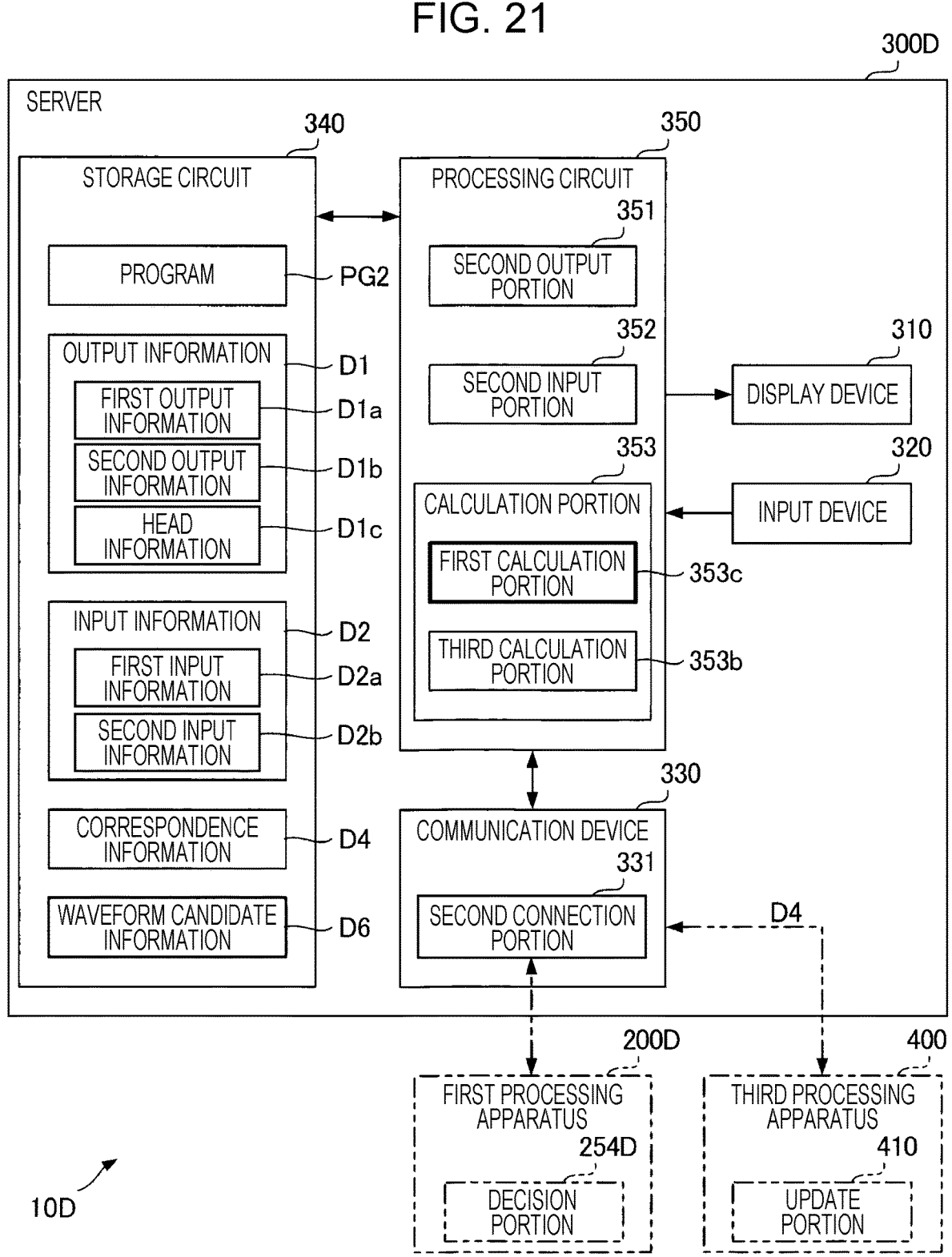
FIG. 21 is a schematic diagram showing a configuration example of a server used in a liquid ejecting system according to a fifth embodiment.

FIG. 21 is a schematic diagram showing a configuration example of a server 300D used in a liquid ejecting system 10D according to the fifth embodiment. The liquid ejecting system 10D is configured in the same manner as the liquid ejecting system 10 of the first embodiment except that a first processing apparatus 200D and the server 300D are provided in place of the first processing apparatus 200 and the server 300.

The server 300D is configured in the same manner as the server 300 of the first embodiment except that the waveform candidate information D6 is used as the first input information D2a. The waveform candidate information D6 is information regarding a candidate of the waveform of the drive pulse PD. The waveform indicated by the waveform candidate information D6 may be a waveform corrected based on the above-mentioned reference waveform, or may be a waveform completely different from the above-mentioned reference waveform.

The calculation portion 353 of the server 300D includes a first calculation portion 353c instead of the second calculation portion 353a. The first calculation portion 353c generates the waveform candidate information D6 based on the output information D1 and the correspondence information D4. Here, the first calculation portion 353c uses, for example, the above-mentioned second table TBL2 or table TBL3 to obtain a correction value for the waveform of the drive pulse PD, and then generates waveform candidate information D6 by using the correction value.

The correspondence information D4 of the present embodiment may be information indicating the correspondence relationship between the combination of the number of times that the drive element 111f is driven and the potential of the drive pulse PD and the waveform of the drive pulse PD. In this case, the first calculation portion 353c uses the correspondence relationship to generate the waveform candidate information D6.

The first processing apparatus 200D is configured in the same manner as the first processing apparatus 200 of the first embodiment except that a decision portion 254D is provided in place of the decision portion 254. The decision portion 254D decides the waveform of the drive pulse PD based on the first input information D2a which is the waveform candidate information D6. More specifically, the decision portion 254D decides, for example, the waveform indicated by the waveform candidate information D6 as the waveform of the drive pulse PD.

Figure 22:
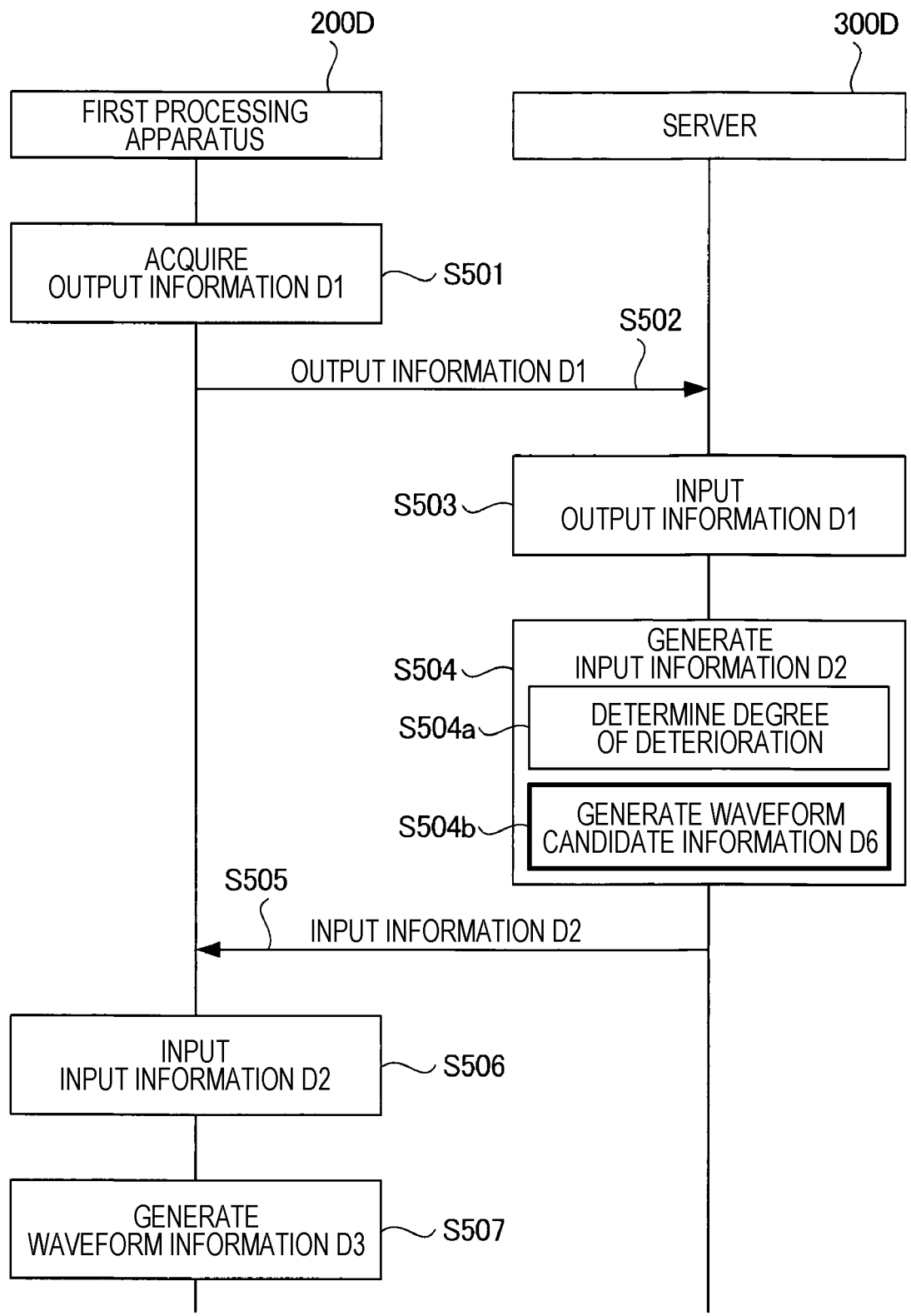
FIG. 22 is a flowchart showing a process of the liquid ejecting system according to the fifth embodiment.

FIG. 22 is a flowchart showing a process of the liquid ejecting system 10D according to the fifth embodiment. In the liquid ejecting system 10D, first, as shown in FIG. 22, in step S501, the first processing apparatus 200D acquires the output information D1. Then, in step S502, the first processing apparatus 200D outputs the output information D1 to the server 300D.

Next, in step S503, the server 300D inputs the output information D1. Then, in step S504, the server 300D generates the input information D2 based on the output information D1.

In the present embodiment, step S504 includes step S504a and step S504b. As similar to the first embodiment, in step S504a, the third calculation portion 353b performs the calculation for determining the degree of deterioration of the drive element 111f. In step S504b, the first calculation portion 353c performs a calculation for generating the waveform candidate information D6 as the first input information D2a.

Then, in step S505, the server 300D outputs the input information D2 to the first processing apparatus 200D.

Next, in step S506, the first processing apparatus 200D inputs the input information D2. Then, in step S507, the first processing apparatus 200D generates the waveform information D3 based on the input information D2. That is, in step S507, the decision portion 254D decides the waveform of the drive pulse PD based on the input information D2. In the present embodiment, the first input information D2a is the waveform candidate information D6. Further, in step S507, the notification portion 255 performs notification based on the second input information D2b as needed.

The decision portion 254D may fine-tune the waveform indicated by the first input information D2a by user input using the input device 220, and then decide the fine-tuned waveform as the waveform of the drive pulse PD to be actually used. Alternatively, even when the decision portion 254D first decides the waveform indicated by the first input information D2a as it is, as the waveform of the drive pulse PD to be actually used, the decision portion 254D may adjust the waveform of the drive pulse PD to increase the amplitude of the drive pulse PD when a usage period based on the number of times of ink ejection from the head unit 110 or the like is equal to or higher than a threshold value.

In the above fifth embodiment, even when the manufacturer of the printer main body is different from the manufacturer of the head, it is possible to reduce the burden on the manufacturer or the user of the printer main body and reduce the deterioration of the print quality due to the deterioration of the drive element 111f over time. In the present embodiment, as described above, the server 300D has the first calculation portion 353c that performs the calculation for generating the waveform candidate information D6 regarding the waveform candidate. The first input information D2a is the waveform candidate information D6. Then, the decision portion 254D decides the waveform of the drive pulse PD supplied to the drive element 111f as the waveform indicated by the waveform candidate information D6. Here, the waveform indicated by the waveform candidate information D6 is, for example, the waveform of the above-mentioned first embodiment which is shown in FIG. 7. Therefore, the waveform indicated by the waveform candidate information D6 includes the first period T1, the second period T2, and the third period T3. The first period T1 is a period in which the absolute value of the potential becomes the first potential E2. The second period T2 is a period in which the absolute value of the potential becomes the second potential E3, which is larger than the first potential E2. The third period T3 is a period between the first period T1 and the second period T2, in which the absolute value of the potential increases from the first potential E2 to the second potential E3.

As described above, the first calculation portion 353c preferably makes one or both of the second potential E3 and the second period T2 different depending on the degree of deterioration indicated by the output information D1. When the second potential E3 is made different, the first calculation portion 353c increases the second potential E3 as the degree of deterioration of the drive element 111f increases. Therefore, the first calculation portion 353c sets the second potential E3 as a first value when the degree of deterioration indicated by the output information D1 is the first degree. Further, the first calculation portion 353c sets the second potential E3 as a second value larger than the first value when the degree of deterioration indicated by the output information D1 is the second degree that indicates further deterioration than the first degree.

As described above, as the degree of deterioration of the drive element 111f increases, the second potential E3 of the drive pulse PD can be increased. As a result, it is possible to reduce the deterioration of the print quality due to the deterioration of the drive element 111f over time.

Further, when the second period T2 is made different, the first calculation portion 353c shortens the second period T2 as the degree of deterioration of the drive element 111f increases. Therefore, the first calculation portion 353c sets the second period T2 as a third value when the degree of deterioration indicated by the output information D1 is the first degree. Further, the first calculation portion 353c sets the second period T2 as a fourth value shorter than the third value when the degree of deterioration indicated by the output information D1 is the second degree that indicates further deterioration than the first degree.

As described above, as the degree of deterioration of the drive element 111f increases, the second period T2 can be shortened. As a result, it is possible to reduce the deterioration of the print quality due to the deterioration of the drive element 111f over time.

6. SIXTH EMBODIMENT

Hereinafter, a sixth embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 23:
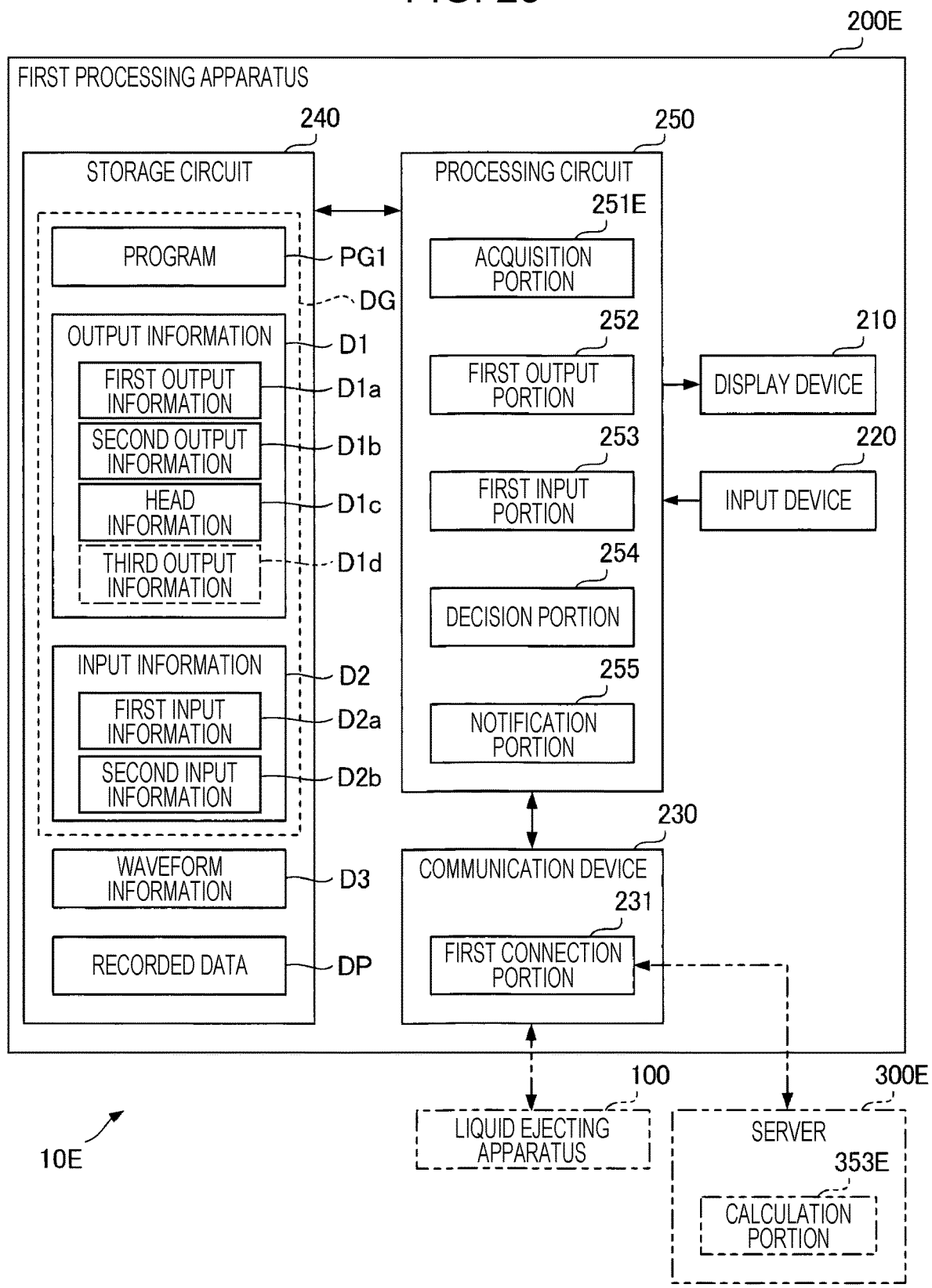
FIG. 23 is a schematic diagram showing a configuration example of a first processing apparatus used in a liquid ejecting system according to a sixth embodiment.

FIG. 23 is a schematic diagram showing a configuration example of a first processing apparatus used in a liquid ejecting system 10E according to the sixth embodiment. The liquid ejecting system 10E is configured in the same manner as the liquid ejecting system 10 of the first embodiment except that a first processing apparatus 200E and a server 300E are provided in place of the first processing apparatus 200 and the server 300.

The first processing apparatus 200E is configured in the same manner as the first processing apparatus 200 of the first embodiment, except that third output information D1d can be included in the output information D1, in place of the first output information D1a. The third output information D1d is information regarding the residual vibration generated in the vibration plate 111e after the drive element 111f is driven. The residual vibration is a vibration having a natural frequency determined by the flow path resistance of an ink flow path in the head chip 111, the inertance of the ink in the flow path, the elastic compliance of the vibration plate 111e, and the like. Here, the residual vibration of the vibration plate 111e is equivalent to the residual vibration of the ink (liquid). The third output information D1d is acquired, for example, based on the voltage value due to the piezoelectric effect on the drive element 111f, which is a piezoelectric element.

The first processing apparatus 200E is configured in the same manner as the first processing apparatus 200 of the first embodiment, except that an acquisition portion 251E is provided in place of the acquisition portion 251. The acquisition portion 251E can select one of the first output information D1a and the third output information D1d. For example, the acquisition portion 251E causes the display device 210 to display an image for GUI for selecting one of the first output information D1a and the third output information D1d. Then, the acquisition portion 251E acquires the second output information D1b and the head information D1c in addition to the selected first output information D1a or third output information D1d. Therefore, the output information D1 acquired by the acquisition portion 251E includes the selected first output information D1a or third output information D1d, the second output information D1b, and the head information D1c. In the present embodiment, the second output information D1b may be omitted.

The server 300E is configured in the same manner as the server 300 except a calculation portion 353E is provided in place of the calculation portion 353. The calculation portion 353E is the same as the calculation portion 353 except that a function of generating the first input information D2a by using the third output information D1d is added. When the output information D1 does not include the third output information D1d but includes the first output information D1a, the calculation portion 353E generates the first input information D2a by the same calculation as the calculation portion 353 of the first embodiment. Further, when the output information D1 does not include the first output information D1a but includes the third output information D1d, the calculation portion 353E generates the first input information D2a so that the voltage of the drive pulse PD increases as the amplitude of the residual vibration indicated by the third output information D1d becomes smaller. As similar to the first embodiment, the second potential E3 or the second period T2 may be adjusted.

Figure 24:
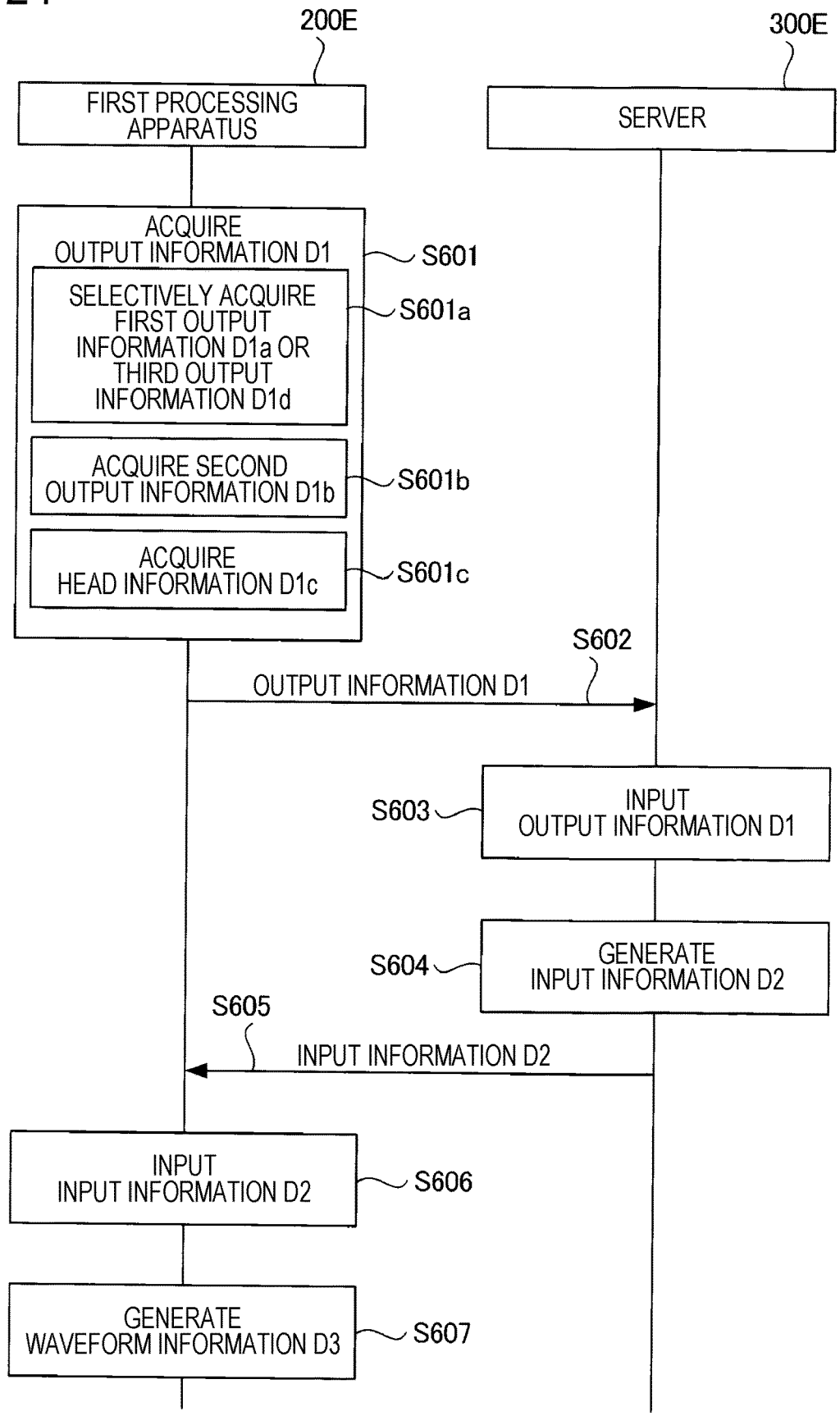
FIG. 24 is a flowchart showing a process of the liquid ejecting system according to the sixth embodiment.

FIG. 24 is a flowchart showing a process of the liquid ejecting system 10E according to the sixth embodiment. In the liquid ejecting system 10E, first, as shown in FIG. 24, in step S601, the first processing apparatus 200E acquires the output information D1.

Specifically, step S601 includes step S601a, step S601b, and step S601c. In step S601a, for example, the acquisition portion 251E acquires the information by receiving the selection of one of the first output information D1a and the third output information D1d. Further, in step S601b, the acquisition portion 251E acquires the second output information D1b. Further, in step S601c, the acquisition portion 251E acquires the head information D1c. The order of the steps is not limited to the example shown in FIG. 24 and any order is possible.

Then, in step S602, the first processing apparatus 200E outputs the output information D1 to the server 300D.

Next, in step S603, the server 300E inputs the output information D1. Then, in step S604, the server 300E generates the input information D2 based on the output information D1. Then, in step S605, the server 300E outputs the input information D2 to the first processing apparatus 200E.

Next, in step S606, the first processing apparatus 200E inputs the input information D2. Then, in step S607, the first processing apparatus 200E generates the waveform information D3 based on the input information D2. Further, in step S607, the notification portion 255 performs notification based on the second input information D2$b$ as needed.

In the above sixth embodiment, even when the manufacturer of the printer main body is different from the manufacturer of the head, it is possible to reduce the burden on the manufacturer or the user of the printer main body and reduce the deterioration of the print quality due to the deterioration of the drive element 111$f$ over time. Here, the head unit 110 further includes the vibration plate 111$e$ that vibrates due to the drive of the drive element 111$f$. Then, in the present embodiment, as described above, the output information D1 includes the third output information D1$d$ regarding the residual vibration generated in the vibration plate 111$e$ after the drive element 111$f$ is driven. Therefore, the server 300E can generate the first input information D2$a$ by using the third output information D1$d$. The third output information D1$d$ is more likely to change depending on the degree of deterioration of the drive element 111$f$ than the first output information D1$a$ and the second output information D1$b$. Therefore, in the generation of the first input information D2$a$ using the third output information D1$d$, there is an advantage that the waveform indicated by the first input information D2$a$ can be easily matched to the degree of deterioration of the drive element 111$f$ with high accuracy, as compared to the generation of the first input information D2$a$ using the first output information D1$a$ and the second output information D1$b$.

Further, in the present embodiment, as described above, the first output portion 252 outputs, as the output information D1, the information selected by the user among the first output information D1$a$ and the third output information D1$d$ through the first connection portion 231. Therefore, the output information D1 can be generated according to the wishes of the user. Here, the acquisition of the first output information D1$a$ and the second output information D1$b$ is easier than the acquisition of the third output information D1$d$. On the other hand, when the third output information D1$d$ is acquired, there is an advantage that the waveform indicated by the first input information D2$a$ can be easily matched to the degree of deterioration of the drive element 111$f$ with high accuracy as described above. The output information D1 may include the third output information D1$d$ instead of the first output information D1$a$ without making the selection.

7. MODIFICATION EXAMPLES

The liquid ejecting system of the present disclosure has been described above based on the illustrated embodiments, but the present disclosure is not limited thereto. Further, the configuration of each portion of the present disclosure can be replaced with any configuration that exhibits the same functions as that of the above-described embodiments, or any configuration can be added.

7-1. Modification Example 1

In the above-described embodiments, the case where the output information D1 includes both the first output information D1$a$ and the second output information D1$b$ is exemplified, but the present disclosure is not limited thereto. For example, one of the first output information D1$a$ and the second output information D1$b$ may be omitted. Further, when the type of the liquid ejecting head 110$a$ or the head unit 110 is known to the server, the head information D1$c$ may not be included in the output information D1.

7-2. Modification Example 2

In the above-described embodiments, the configuration in which the input information D2 includes both the first input information D2$a$ and the second input information D2$b$ is exemplified, but the second input information D2$b$ may be omitted. Further, the second input information D2$b$ may be output from the server only when necessary, such as when the degree of deterioration of the drive element 111$f$ is equal to or higher than a predetermined degree.

7-3. Modification Example 3

In the above-described embodiments, the configuration in which the server 300 is a cloud server is exemplified, but the configuration is not limited thereto. For example, the server 300 may be a server other than a cloud server or a virtual server, or may be an on-premises server.

7-4. Modification Example 4

In the above-described embodiments, the configuration in which the drive element 111$f$ is a piezoelectric element is exemplified, but the configuration is not limited thereto, and for example, the drive element 111$f$ may be a heater that heats ink in the pressure chamber C. That is, the drive method of the head chip 111 is not limited to the piezoelectric method, and may be, for example, a thermal method.

What is claimed is:

1. A liquid ejecting system comprising:
   a head unit that includes a nozzle for ejecting a liquid, a pressure chamber communicating with the nozzle, and a drive element for applying pressure fluctuation to a liquid in the pressure chamber by supplying a drive pulse;
   a first connection portion that is communicably connected to a server through a network;
   a decision portion that decides a waveform of the drive pulse supplied to the drive element based on first input information;
   a first input portion to which the first input information is input from the server through the first connection portion; and
   a first output portion that outputs output information regarding a degree of deterioration of the drive element to the server through the first connection portion, wherein
   the server includes
      a second connection portion that is communicably connected to the first connection portion,
      a second input portion to which the output information is input through the second connection portion,
      a storage portion that stores correspondence information regarding a correspondence relationship between the degree of deterioration of the drive element and the waveform of the drive pulse,
      a fourth calculation portion that performs a calculation for generating the first input information based on the output information and the correspondence information, and
      a second output portion that outputs the first input information through the second connection portion.

2. The liquid ejecting system according to claim 1, further comprising:

a liquid ejecting apparatus that includes the head unit;
a first processing apparatus that is communicably connected to the liquid ejecting apparatus and generates recorded data used in the liquid ejecting apparatus; and
the server.

3. The liquid ejecting system according to claim 2, further comprising a second processing apparatus that is communicably connected to the liquid ejecting apparatus, wherein
the first input portion and the first connection portion are provided in the second processing apparatus.

4. The liquid ejecting system according to claim 3, wherein the liquid ejecting apparatus and the second processing apparatus are communicably connected to each other by short-range wireless communication.

5. The liquid ejecting system according to claim 1, wherein
the server includes a first calculation portion that performs a calculation for generating waveform candidate information regarding a waveform candidate,
the first input information is the waveform candidate information,
the decision portion decides the waveform of the drive pulse supplied to the drive element as a waveform indicated by the waveform candidate information, and
the waveform indicated by the waveform candidate information includes
a first period in which an absolute value of a potential is a first potential,
a second period in which an absolute value of a potential is a second potential greater than the first potential, and
a third period that is between the first period and the second period and in which an absolute value of a potential increases from the first potential to the second potential.

6. The liquid ejecting system according to claim 5, wherein the first calculation portion sets the second potential as a first value when the degree of deterioration indicated by the output information is a first degree, and sets the second potential as a second value greater than the first value when the degree of deterioration indicated by the output information is a second degree indicating further deterioration than the first degree.

7. The liquid ejecting system according to claim 5, wherein the first calculation portion sets the second period as a third value when the degree of deterioration indicated by the output information is a first degree, and sets the second period as a fourth value shorter than the third value when the degree of deterioration indicated by the output information is a second degree indicating further deterioration than the first degree.

8. The liquid ejecting system according to claim 1, wherein
the server includes a second calculation portion that performs a calculation for generating correction information for correcting a reference waveform,
the first input information is the correction information,
the decision portion decides the waveform of the drive pulse supplied to the drive element by correcting the reference waveform using the correction information, and
the reference waveform includes
a first period in which an absolute value of a potential is a first potential,
a second period in which an absolute value of a potential is a second potential greater than the first potential, and
a third period that is between the first period and the second period and in which an absolute value of a potential increases from the first potential to the second potential.

9. The liquid ejecting system according to claim 8, wherein the second calculation portion makes a correction with a first correction amount to increase the second potential when the degree of deterioration indicated by the output information is a first degree, and makes a correction with a second correction amount greater than the first correction amount to increase the second potential when the degree of deterioration indicated by the output information is a second degree indicating further deterioration than the first degree.

10. The liquid ejecting system according to claim 8, wherein the second calculation portion makes a correction with a third correction amount to shorten the second period when the degree of deterioration indicated by the output information is a first degree, and makes a correction with a fourth correction amount greater than the third correction amount to shorten the second period when the degree of deterioration indicated by the output information is a second degree indicating further deterioration than the first degree.

11. The liquid ejecting system according to claim 1, wherein
the server includes a third calculation portion that performs a calculation for determining the degree of deterioration of the drive element based on the output information,
the output information includes first output information regarding the number of times that the drive element is driven, and
the third calculation portion determines that the degree of deterioration of the drive element is a third degree when the number of times indicated by the first output information is a first number of times, and determines that the degree of deterioration of the drive element is a fourth degree indicating further deterioration than the third degree when the number of times indicated by the first output information is a second number of times greater than the first number of times.

12. The liquid ejecting system according to claim 1, wherein
the server includes a third calculation portion that performs a calculation for determining the degree of deterioration of the drive element based on the output information,
the output information includes second output information regarding an amount corresponding to a deterioration amount per one drive of the drive element, and
the third calculation portion determines that the degree of deterioration of the drive element is a fifth degree when the amount indicated by the second output information is a first amount, and determines that the degree of deterioration of the drive element is a sixth degree indicating further deterioration than the fifth degree when the amount indicated by the second output information is a second amount greater than the first amount.

13. The liquid ejecting system according to claim 1, wherein
the head unit further includes a vibration plate that vibrates by drive of the drive element, and
the output information includes third output information regarding residual vibration generated in the vibration plate after driving the drive element.

14. The liquid ejecting system according to claim 1, wherein the head unit further includes a vibration plate that vibrates by drive of the drive element, and the first output portion outputs information selected by a user from among first output information regarding the number of times that the drive element is driven and third output information regarding residual vibration generated in the vibration plate after driving the drive element as the output information through the first connection portion.

15. The liquid ejecting system according to claim 1, further comprising a third processing apparatus that is communicably connected to the server, wherein the third processing apparatus includes an update portion that updates the correspondence information.

16. The liquid ejecting system according to claim 1, further comprising a notification portion that notifies a user of a determination result of deterioration of the drive element based on second input information, wherein the second input information is input to the first input portion through the first connection portion.

17. A liquid ejecting system comprising:

a head unit that includes a nozzle for ejecting a liquid, a pressure chamber communicating with the nozzle, and a drive element for applying pressure fluctuation to a liquid in the pressure chamber by supplying a drive pulse;

a first connection portion that is communicably connected to a server through a network;

a decision portion that decides a waveform of the drive pulse supplied to the drive element based on first input information;

a first input portion to which the first input information is input from the server through the first connection portion; and a first output portion that outputs output information regarding a degree of deterioration of the drive element to the server through the first connection portion, wherein the server includes a second calculation portion that performs a calculation for generating correction information for correcting a reference waveform, the first input information is the correction information, the decision portion decides the waveform of the drive pulse supplied to the drive element by correcting the reference waveform using the correction information, and the reference waveform includes a first period in which an absolute value of a potential is a first potential, a second period in which an absolute value of a potential is a second potential greater than the first potential, and a third period that is between the first period and the second period and in which an absolute value of a potential increases from the first potential to the second potential.

18. A liquid ejecting system comprising:

a head unit that includes a nozzle for ejecting a liquid, a pressure chamber communicating with the nozzle, and a drive element for applying pressure fluctuation to a liquid in the pressure chamber by supplying a drive pulse;

a first connection portion that is communicably connected to a server through a network;

a decision portion that decides a waveform of the drive pulse supplied to the drive element based on first input information;

a first input portion to which the first input information is input from the server through the first connection portion; and a first output portion that outputs output information regarding a degree of deterioration of the drive element to the server through the first connection portion, wherein the server includes a third calculation portion that performs a calculation for determining the degree of deterioration of the drive element based on the output information, the output information includes second output information regarding an amount corresponding to a deterioration amount per one drive of the drive element, and the third calculation portion determines that the degree of deterioration of the drive element is a fifth degree when the amount indicated by the second output information is a first amount, and determines that the degree of deterioration of the drive element is a sixth degree indicating further deterioration than the fifth degree when the amount indicated by the second output information is a second amount greater than the first amount.

* * * * *